(12) United States Patent
Ishikawa et al.

(10) Patent No.: US 12,455,516 B2
(45) Date of Patent: Oct. 28, 2025

(54) FERRITE PARTICLE, CARRIER CORE MATERIAL FOR ELECTROPHOTOGRAPHIC DEVELOPER, CARRIER FOR ELECTROPHOTOGRAPHIC DEVELOPER, AND ELECTROPHOTOGRAPHIC DEVELOPER

(71) Applicant: POWDERTECH CO., LTD., Kashiwa (JP)

(72) Inventors: Makoto Ishikawa, Chiba (JP); Tetsuya Uemura, Chiba (JP)

(73) Assignee: POWDERTECH CO., LTD., Kashiwa (JP)

( * ) Notice: Subject to any disclaimer, the term of this patent is extended or adjusted under 35 U.S.C. 154(b) by 433 days.

(21) Appl. No.: 18/022,961

(22) PCT Filed: Aug. 24, 2021

(86) PCT No.: PCT/JP2021/030909
§ 371 (c)(1),
(2) Date: Feb. 23, 2023

(87) PCT Pub. No.: WO2022/045097
PCT Pub. Date: Mar. 3, 2022

(65) Prior Publication Data
US 2023/0296999 A1 Sep. 21, 2023

(30) Foreign Application Priority Data
Aug. 24, 2020 (JP) ................................. 2020-140578

(51) Int. Cl.
*G03G 9/107* (2006.01)
*C01G 25/02* (2006.01)
(Continued)

(52) U.S. Cl.
CPC ........... *G03G 9/1085* (2020.08); *C01G 25/02* (2013.01); *C04B 35/2658* (2013.01); *H01F 1/407* (2013.01)

(58) Field of Classification Search
CPC ...... C01G 25/02; C01G 49/0018; C01F 11/02
See application file for complete search history.

(56) References Cited

U.S. PATENT DOCUMENTS 5,190,842 A * 3/1993 Saha .................... G03G 9/1075
252/62.63
2004/0229151 A1 11/2004 Kobayashi et al.
(Continued)

FOREIGN PATENT DOCUMENTS

| JP | S63-069717 A | 3/1988 |
|---|---|---|
| JP | 3872024 B2 | 1/2007 |

(Continued)

OTHER PUBLICATIONS

International Searching Authority, "International Search Report," issued in connection with International Patent Application No. PCT/JP2021/030909, dated Oct. 5, 2021.
(Continued)

*Primary Examiner* — Mark F. Huff
*Assistant Examiner* — Charles Collins Sullivan, IV
(74) *Attorney, Agent, or Firm* — Foley & Lardner LLP

(57) ABSTRACT

The present invention relates to a ferrite particle containing a crystal phase component containing a perovskite-type crystal represented by a composition formula of RZrO3 (wherein R is an alkaline earth metal element), and a Mg content of 0.45 mass % or less. The present invention also relates to a carrier core material for an electrophotographic developer, containing the ferrite particle; a carrier for an electrophotographic developer, containing the ferrite particle and a resin coating layer provided on a surface of the
(Continued)

ferrite particle; and an electrophotographic developer containing the carrier for an electrophotographic developer and a toner.

9 Claims, 1 Drawing Sheet

(51) Int. Cl.
  *C04B 35/26* (2006.01)
  *H01F 1/40* (2006.01)

(56) References Cited

U.S. PATENT DOCUMENTS

| | | |
|---|---|---|
| 2011/0111337 A1 | 5/2011 | Horie et al. |
| 2019/0391506 A1 | 12/2019 | Ogawa |
| 2020/0026211 A1 | 1/2020 | Sawamoto et al. |

FOREIGN PATENT DOCUMENTS

| | | |
|---|---|---|
| JP | 2011-118380 A | 6/2011 |
| JP | 2012-076959 A | 4/2012 |
| JP | 2015-151287 A | 8/2015 |
| JP | 5886336 B2 | 3/2016 |
| JP | 2016-106262 A | 6/2016 |
| JP | 2017-151133 A | 8/2017 |
| WO | WO-2018/147002 A1 | 8/2018 |
| WO | WO-2018/180543 A1 | 10/2018 |

OTHER PUBLICATIONS

International Searching Authority, "Written Opinion," issued in connection with International Patent Application No. PCT/JP2021/030909, dated Oct. 5, 2021.

* cited by examiner

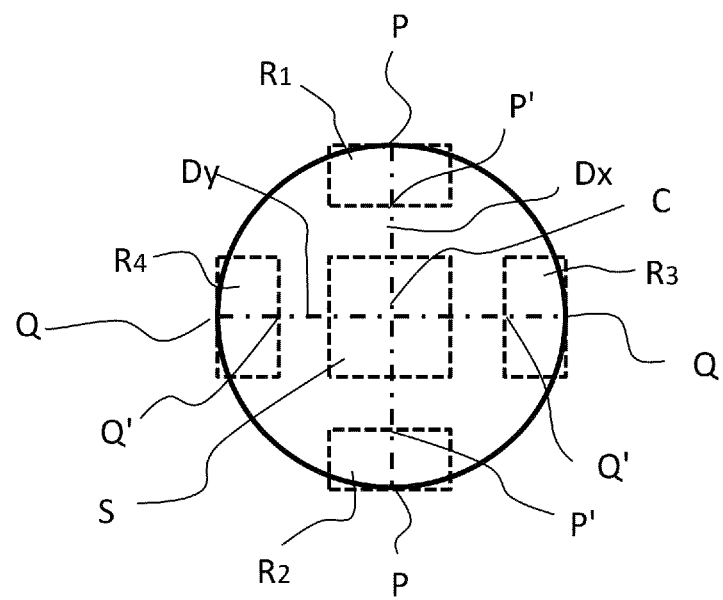

FERRITE PARTICLE, CARRIER CORE MATERIAL FOR ELECTROPHOTOGRAPHIC DEVELOPER, CARRIER FOR ELECTROPHOTOGRAPHIC DEVELOPER, AND ELECTROPHOTOGRAPHIC DEVELOPER

CROSS-REFERENCE TO RELATED APPLICATIONS

The present application claims priority under 35 U.S.C. § 371 to International Patent Application No. PCT/JP2021/030909, filed Aug. 24, 2021, which claims priority to and the benefit of Japanese Patent Application No. 2020-140578, filed on Aug. 24, 2020. The contents of these applications are hereby incorporated by reference in their entireties.

TECHNICAL FIELD

The present invention relates to a ferrite particle, a carrier core material for an electrophotographic developer, a carrier for an electrophotographic developer, and an electrophotographic developer.

BACKGROUND ART

An electrophotographic developing method refers to a method in which a toner in a developer is adhered to an electrostatic latent image formed on a photoreceptor to develop the electrostatic latent image. A developer used in this method is divided into a two-component developer composed of a toner and a carrier and a one-component developer using only a toner. As a developing method using a two-component developer, a cascade method or the like was adopted in the past, but a magnetic brush method using a magnet roll is currently the mainstream.

In the magnetic brush method, a carrier and a toner are stirred and mixed in a developing box filled with a developer, thereby imparting an electric charge to the toner. Then, the carrier is transported to a surface of a photoreceptor by a developing roll that holds a magnet. At this time, the charged toner is transported to the surface of the photoreceptor by the carrier. After a toner image is formed on the photoreceptor by electrostatic action, the carrier remaining on the developing roll is collected again into the developing box, stirred and mixed with a new toner, and repeatedly used for a certain period of time.

Unlike the one-component developer, since the two-component developer can be designed by separating the magnetic property and the electrical property of the carrier itself from the toner, the controllability at the time of designing the developer is good. Therefore, the two-component developer is suitable for a full-color developing device that requires high image quality, a device for performing high-speed printing that requires reliability and durability of image maintenance, and the like.

In recent years, in order to develop an electrostatic latent image with high definition, a particle diameter of the toner has been reduced. With the reduction in the particle diameter of the toner, a particle diameter of the carrier is also reduced from the viewpoint of imparting charge to the toner. In the case where the charging ability of the carrier is insufficient, a memory image is likely to occur due to fogging caused by a low-charged toner or due to a decrease in an amount of toner transported to a developing region.

Therefore, various studies have been made on a carrier having high charging ability. For example, Patent Literature 1 and Patent Literature 2 describe that a carrier having a high charge imparting ability to a toner and high environmental stability can be obtained by using, as a carrier core material, ferrite particles to which Ti or Sr is added and whose surface unevenness is appropriately controlled.

CITATION LIST

Patent Literature

Patent Literature 1: JP2016-106262A
Patent Literature 2: Japanese Patent No. 5886336

SUMMARY OF INVENTION

Technical Problem

Unfortunately, the carrier using the ferrite particles in the related art (Patent Literature 1 and Patent Literature 2) as a carrier core material is insufficient in charging ability and environmental stability. In general, inevitable impurities such as Cl caused by a Fe raw material or the like are present on a surface of the ferrite particles. These inevitable impurities are easily ionized by moisture in the atmosphere. Therefore, in the case where such inevitable impurities are present in a large amount on the surface of the ferrite particles, a resistance value is likely to decrease under a high temperature and high humidity environment, and the environmental property of the charging property is likely to vary.

Accordingly, an object of the present invention is to provide a ferrite particle having high charging ability and environmental stability, a carrier core material for an electrophotographic developer, a carrier for an electrophotographic developer, and an electrophotographic developer.

Solution to Problem

In order to solve the above problems, a crystal phase component containing a perovskite-type crystal represented by a composition formula of $RZrO_3$ (where R is an alkaline earth metal element) is contained, and the Mg content is 0.45 mass % or less.

In the ferrite particle according to the present invention, R is preferably at least one element selected from the group consisting of Sr, Ca, and Ba.

In the ferrite particle according to the present invention, the crystal phase component containing the perovskite-type crystal is contained in an amount of preferably 0.05 mass % or more and 4.00 mass % or less when a phase composition analysis on a crystal phase constituting the ferrite particle is performed by Rietveld analysis of an X-ray diffraction pattern.

In the ferrite particle according to the present invention, the Cl concentration measured by an elution method is preferably 30 ppm or less.

The ferrite particle according to the present invention is preferably a spinel-type ferrite particle containing Mn, and satisfying the following formula when the content of Mn in the ferrite particle is denoted x (mass %) and the content of Fe in the ferrite particle is denoted y (mass %):

$$0.30y \le x \le 0.60y.$$

The ferrite particle according to the present invention preferably contains substantially no Ti.

In order to solve the above problems, a carrier core material for an electrophotographic developer according to the present invention includes the ferrite particle.

In order to solve the above problems, a carrier for an electrophotographic developer according to the present invention includes the ferrite particle and a resin coating layer provided on a surface of the ferrite particle.

In order to solve the above problems, an electrophotographic developer according to the present invention includes the carrier for an electrophotographic developer and a toner.

The electrophotographic developer according to the present invention may be used as a replenishing developer.

Advantageous Effects of Invention

According to the present invention, a ferrite particle having high charging ability and environmental stability, a carrier core material for an electrophotographic developer, a carrier for an electrophotographic developer, and an electrophotographic developer can be provided.

BRIEF DESCRIPTION OF DRAWINGS

The FIGURE is a view schematically illustrating a cross section of a ferrite particle, and is a view for explaining a method of determining a dispersion degree of Zr in the ferrite particle.

DESCRIPTION OF EMBODIMENTS

Hereinafter, embodiments of a ferrite particle, a carrier core material for an electrophotographic developer, a carrier for an electrophotographic developer, and an electrophotographic developer according to the present invention will be described. In the present description, the ferrite particle, the carrier core material for an electrophotographic developer, the carrier for an electrophotographic developer, and the electrophotographic developer each mean an aggregate of individual particles, that is, a powder, unless otherwise specified. First, an embodiment of the ferrite particle will be described. The ferrite particle according to the present invention is described below as being used mainly as a carrier core material for an electrophotographic developer. However, the ferrite particle according to the present invention can be used in various applications such as a magnetic ink, a magnetic fluid, various functional fillers such as a magnetic filler, a filler for a bonded magnet, and a filler for an electromagnetic wave shielding material, and an electronic component material, and the application of the ferrite particle is not limited to a carrier core material for an electrophotographic developer.

1. Ferrite Particle and Carrier Core Material for Electrophotographic Developer

First, an embodiment of the ferrite particle according to the present invention will be described. The ferrite particle according to the present invention contains a crystal phase component (hereinafter referred to as "perovskite-type crystal phase component") containing a perovskite-type crystal represented by a composition formula of $RZrO_3$ (where R is an alkaline earth metal element).

1-1. Perovskite-Type Crystal Phase Component

First, a perovskite-type crystal phase component represented by a composition formula of $RZrO_3$ (where R is an alkaline earth metal element) will be described.

As a carrier for a two-component electrophotographic developer suitable for a magnetic brush method, a resin-coated carrier in which a magnetic particle is used as a core material and a surface thereof is coated with a resin is used. A ferrite particle, which is a magnetic oxide containing ferric oxide ($Fe_2O_3$), is mainly used as the magnetic particle serving as the core material. Here, in order to improve the environmental stability of the charging property of the carrier, it is important to prevent leakage of an electric charge from the surface of the carrier. In addition, in order to obtain a carrier having good charge rising property, it is important to increase the contact frequency and the contact strength between the carrier and a toner. In the present description and the like, the environmental stability of the charging property means that the difference between a charge amount under a normal temperature and normal humidity environment and a charge amount under a high temperature and high humidity environment is small, or the difference between the charge rising property under a normal temperature and normal humidity environment and the charge rising property under a high temperature and high humidity environment is small.

First, the environmental stability of the charging property will be described. In recent years, a multi-component ferrite particle containing metal elements such as Mg, Mn, Sr, and Ca in addition to Fe has been widely used as a core material. When ferrite is produced, metal oxides, metal hydroxides, or the like containing metal elements having a desired composition are used as raw materials. In order to obtain a ferrite particle having high magnetization, it is required to sufficiently proceed a ferritization reaction of the raw material so that an unreacted raw material not exhibiting magnetism (hereinafter, referred to as an "unreacted raw material") does not remain in the ferrite particle. However, in the case of the multi-component ferrite, a generation temperature and a generation rate of ferrite vary depending on a combination of elements, and a ferrite reaction proceeds only on a contact surface between raw materials, and thus it is difficult to completely convert the raw material into ferrite under general sintering conditions. Therefore, unreacted raw materials remain in the ferrite particle.

In addition, the raw material of ferrite contains metals or metal compounds that are not involved in the ferrite reaction, such as Na, K, and Cl, as inevitable impurities. These inevitable impurities do not exhibit magnetism. Therefore, in order to obtain a ferrite particle having high magnetization, it is necessary to reduce the amount of the inevitable impurities. However, even if a raw material having high purity is used, a small amount of inevitable impurities is present in the raw material, and it is not realistic to completely remove the inevitable impurities.

Further, in the case where the structure of the ferrite particle has a defect, the magnetization of the ferrite particle decreases. Examples of the structural defect that causes the decrease in magnetization include defects (for example, lattice defects) in ferrite particle. In the case of the multi-element ferrite, the ferrite reaction becomes complicated as compared with a single-element ferrite, and thus a structural defect is likely to occur.

On the other hand, the ferrite particle is made of a metal oxide, and thus generally has high resistance. However, when moisture adheres to the surface, the resistance decreases. In addition, the inevitable impurities such as Na, K, and Cl contained in the raw material are easily ionized due to the presence of moisture in the atmosphere. Therefore, when the amount of the inevitable impurities in the ferrite particle increases, the resistance of the ferrite particle decreases, and electric charge leakage is likely to occur. In addition, in the case where the amount of the inevitable impurities is large, electric charge leakage is highly likely to occur when the ambient humidity is high, which leads to deterioration of the environmental stability of the charging property.

Therefore, in order to obtain a ferrite particle having good charging property and small environmental dependency of charging property, it is necessary to reduce the amount of the inevitable impurities in the ferrite particle. However, as described above, it is practically difficult to completely remove the inevitable impurities.

Incidentally, the ferrite particle is often polycrystalline, which is an aggregate of single crystals. Even in the case where the composition of the ferrite particle is the same, the magnetic property and the electrical property of the ferrite particle change depending on the structure of the ferrite particle. Therefore, the present inventors focus on the structure of the ferrite particle, and find that it is important to contain a perovskite-type crystal phase component represented by a composition formula of $RZrO_3$ (where R is an alkaline earth metal element) in order to obtain ferrite having high environmental stability of charging property.

The present inventors presume the reason why the above problems can be solved by containing a perovskite-type crystal phase component represented by a composition formula of $RZrO_3$ (where R is an alkaline earth metal element) as follows.

Components that do not form a solid solution with ferrite, such as unreacted raw materials and inevitable impurities are present in a grain boundary of the ferrite particle. These components extruded to the grain boundary along with growth of crystal grains are also present on the surface of the ferrite particle. In the case of the ferrite particle having the same size, when the crystal grains constituting the ferrite particle become large, a grain boundary volume becomes small as compared with the case where the crystal grains are small. As a result, the inevitable impurities such as Na, K, and Cl are also extruded from the grain boundary and are easily segregated on the surface of the ferrite particle. These substances have high affinity for moisture in the air, and are easily ionized as described above. In the case where such a substance having high affinity for water is present on the surface of the ferrite particle, electric charge leakage is likely to occur from the substance as a starting point. Therefore, the charge rising property of the carrier is deteriorated, and the charge imparting ability of the carrier is deteriorated. It is considered that in the ferrite particle having such a structure, the environmental variation in charging property is also increased due to the change in ambient humidity. However, as described above, it is difficult to completely remove unreacted raw materials and inevitable impurities in the ferrite particle.

On the other hand, since the perovskite-type crystal represented by the composition formula of $RZrO_3$ (where R is an alkaline earth metal element) does not form a solid solution with other crystal phases having different crystal structures, such as a spinel-type crystal, the perovskite-type crystal phase component is dispersed in the grain boundary of the ferrite particle. Therefore, in the ferrite particle containing this crystal phase component, the grain boundary volume of the ferrite particle relatively increases as compared with the case where this crystal phase component is not contained. In the case where the amount of inevitable impurities contained in the ferrite particle is the same, a distribution density of the inevitable impurities at the grain boundary relatively decreases as the grain boundary volume of the ferrite particle relatively increases. In addition to the inevitable impurities, this crystal phase component, which is an insulating substance, is present at the grain boundary. In the ferrite particle according to the present invention, since the grain boundary is distributed in a complicated manner in the particle, and the inevitable impurities and the insulating substance such as the crystal phase component are distributed discontinuously at the grain boundary, it is possible to prevent segregation of a substance having high affinity for moisture on the surface of the ferrite particle. Therefore, according to the ferrite particle according to the present invention, it is considered that the charge rising is good and the environmental stability can be improved.

Further, the perovskite-type crystal phase component represented by the composition formula of $RZrO_3$ (where R is an alkaline earth metal element) has high insulation property, and the crystal phase component is present at the grain boundary or the surface of the particle, whereby the resistance of the ferrite particle can be improved and electric charge leakage is prevented. In order to obtain a ferrite particle containing this crystal phase component, a compound containing Zr (for example, $ZrO_2$) is used as a raw material. For example, in the case where the multi-component ferrite has a composition containing R, since a raw material containing R and a compound containing Zr undergo a solid phase reaction, the content of the unreacted raw material in the ferrite particle can be reduced. Therefore, the occurrence of structural defects can be prevented, and a ferrite particle having relatively good charging property can be obtained.

For these reasons, it is presumed that the environmental stability of the charging property can be improved for the above reasons by using the ferrite particle containing a perovskite-type crystal phase component represented by a composition formula of $RZrO_3$ (where R is an alkaline earth metal element).

The ferrite particle containing a perovskite-type crystal phase component represented by a composition formula of $RZrO_3$ (where R is an alkaline earth metal element) means that the crystal phase component is contained at least in the ferrite particle, it is preferable that the dispersion of the crystal phase component in the ferrite particle is good, and it is more preferable that the crystal phase component is uniformly dispersed on the surface of and in the ferrite particle.

1-2. Mg Content (Mass %)

The ferrite particle contains the perovskite-type crystal phase component, whereby the above-described properties are obtained. By further setting the Mg content in the ferrite particle to 0.45 mass % or less, the following properties are obtained. Here, the Mg content in the present invention refers to a value obtained based on a value measured by ICP elemental analysis, which will be described later. As a result of intensive studies, the present inventors found that a ferrite core material having high charging ability and good environmental stability can be obtained by setting the Mg content in the ferrite particle to be within the above-described range as compared with the case where the Mg content is more than 0.45 mass %. The present inventors presume the reason for this as follows. The charging occurs due to the movement of the electric charge. It is considered that when a single-component ferrite and a multi-component ferrite are compared, electric charge movement in the ferrite is less likely to occur in the multi-component ferrite. Therefore, it is considered that by setting the Mg content in the ferrite particle to 0.45 mass % or less to relatively reduce the Mg content in the ferrite composition, the ferrite particle becomes close to a single-component ferrite or becomes a single-component ferrite, electric charge movement becomes easy, and the charging ability is improved. Here, the lower limit value of the Mg content is 0.00 mass %, but the Mg content may be more than 0.00 mass %, and more preferably 0.05 mass % or more or more than 0.05 mass %.

1-3. Spinel-Type Ferrite Particle and Spinel-Type Crystal Phase Component

The ferrite particle may be a spinel-type ferrite particle, a magnetoplumbite-type ferrite particle, a garnet-type ferrite particle, or the like as long as the ferrite particle contains the perovskite-type crystal phase and the Mg content is as described above. From the viewpoint of obtaining suitable resistance and magnetization as a core material of a carrier of a two-component electrophotographic developer, the ferrite particle is preferably a spinel-type ferrite particle, and particularly preferably a spinel-type ferrite particle containing Mn. The spinel-type ferrite particle containing Mn can be represented by, for example, $(MnO)a(MgO)b(Fe_2O_3)c$ (where $a+b+c=100$ (mol %), $a \neq 0$, $0 \leq b$, and $c \neq 0$). It is considered that in the spinel-type ferrite particle containing Mn, the Mg content is within the above-described range, whereby the ferrite particle becomes close to Mn ferrite as a single-component ferrite or becomes substantially Mn ferrite, and the charging ability is improved as described above.

In the case where the ferrite particle is a spinel-type ferrite particle containing Mn, the magnetization on a low magnetic field side can be increased. Further, it is possible to prevent re-oxidation of ferrite when being taken out from a furnace after sintering. By using the spinel-type ferrite particle containing Mg together with Mn, the magnetization and resistance of the ferrite particle can be easily adjusted. However, even in the case where Mg is not contained, the magnetization and the resistance can be adjusted by strictly managing producing conditions such as an oxygen concentration at the time of sintering.

In order to exert the above-described effects, when the content of Mn is denoted x (mass %) and the content of Fe is denoted y (mass %), the ferrite particle preferably satisfies the following formula.

$$0.30y \leq x \leq 0.60y \tag{1}$$

In the spinel-type crystal phase component represented by the above-described composition formula, when the values of "x" and "y" change, the magnetic property and the electrical property change. In the case where the ferrite particle is a spinel-type ferrite particle represented by the above-described composition formula, when the value of "x" becomes relatively small with respect to the value of "y", the content ratio of magnetite having a low resistance increases, and a resistance value of the entire ferrite particle also changes. Therefore, by appropriately adjusting content ratios of "x" and "y" within the range satisfying the above-mentioned formula (1), the balance between magnetization and resistance is improved, and it is easy to exert the above-described effects.

For example, in the case where the ratio is less than a lower limit value of the above-mentioned formula (1), the content ratio of "MnO" becomes small with respect to "$Fe_2O_3$" in the ferrite particle, and as described above, the content ratio of the magnetite having a low resistance relatively increases. In this case, since electric charges are likely to leak from the particle surface, it may be difficult to adjust the resistance value to a value suitable for the carrier core material of the two-component electrophotographic developer. In the case where the ratio exceeds an upper limit value of the above-mentioned formula (1), the content ratio of "MnO" with respect to "$Fe_2O_3$" in the ferrite particle becomes large, and the resistance value may become excessively high beyond an appropriate range. In this case, an image defect such as white spot may occur due to the high resistance value, and it may be difficult to adjust the resistance value to a value suitable for the carrier core material of the two-component electrophotographic developer.

By satisfying the above-mentioned formula (1), for example, even in the case where the content ratio of "MnO" with respect to "$Fe_2O_3$" in the ferrite particle is low as in the following formula (2), the above-described effects can be exerted by adjusting the Mg content, the sintering conditions (for example, the sintering temperature and the atmospheric oxygen concentration during sintering) during production of the ferrite particle, and the like.

$$0.30y \leq x \leq 0.36y \tag{2}$$

In addition, in order to exert the above-described effects, in the range of the above-mentioned formula (1), for example, in the case where the content ratio of "MnO" with respect to "$Fe_2O_3$" is increased as represented by the following formula (3), a ferrite particle having high magnetization, a resistance value in a range appropriate for the carrier core material of the electrophotographic developer, higher charging ability, and more excellent environmental stability of the charging property can be obtained.

$$0.44y \leq x \leq 0.60y \tag{3}$$

In order to exert the above-described effects, it is also preferable that "x" and "y" are within the following ranges. By appropriately adjusting "x" and "y" within the following ranges, the same effects as those described above can be exerted. $17.0 \leq x \leq 27.5$, $44.5 \leq y \leq 54.5$. In the above-mentioned formulas and the following formulas, an inequality sign with an equality sign may be converted into an inequality sign, and a preferable upper limit value and a preferable lower limit value may be appropriately combined.

1-4. Content Ratio of Crystal Phase Component

When the phase composition analysis on the crystal phase constituting the ferrite particle is performed by Rietveld analysis of an X-ray diffraction pattern, it is preferable to contain 0.05 mass % or more and 4.00 mass % or less of the perovskite-type crystal phase component represented by the above-described composition formula of $RZrO_3$.

In the case where the content ratio of the perovskite-type crystal phase component represented by the above-described composition formula of $RZrO_3$ is within the above-described range, the crystal phase component can be easily uniformly dispersed in the ferrite particle, the occurrence of a structural defect can be prevented, and the environmental stability of the charging property can be more easily improved.

In order to exert these effects, the ferrite particle preferably contains the crystal phase component in an amount of 0.10 mass % or more, more preferably 0.15 mass % or more, and still more preferably 0.20 mass % or more. The ferrite particle preferably contains the crystal phase component in an amount of 3.50 mass % or less, and more preferably 3.00 mass % or less.

The ferrite particle is preferably a spinel-type ferrite particle containing Mn. In this case, the ferrite particle preferably contains the spinel-type crystal phase component in an amount of 90 mass % or more, preferably 93 mass % or more, and more preferably 95 mass % or more. That is, the ferrite particle is preferably a spinel-type ferrite particle containing a spinel-type crystal phase component except for the perovskite-type crystal phase component and inevitable impurities or unreacted raw materials. The content of the spinel-type crystal phase component can be determined by a ratio of metal elements at the time of blending raw materials. In general, the spinel-type ferrite is produced by a solid phase reaction. In the ferritization reaction performed in a sintering step at this time, a solid solution (spinel-type crystal phase) starts to be generated from about 850° C., and the ferritization reaction is completed at about 1,250° C. The spinel-type crystal phase can be selectively generated by appropriately adjusting the sintering temperature, the sintering time, the sintering atmosphere, and the cooling time in the sintering step, and thus the content ratio of the spinel-type crystal phase in the ferrite particle can be determined.

1-5. Constituent Elements, Composition, and the Like

Next, a preferred embodiment of the constituent elements, composition, and the like of the ferrite particle according to the present invention will be described. First, matters relating to the perovskite-type crystal phase component having a composition formula of $RZrO_3$ will be described.

(1) Zirconium Content

The ferrite particle preferably contains 0.04 mass % or more and 3.00 mass % or less of zirconium. In the case where zirconium is contained within this range, the content ratio of the perovskite-type crystal phase component represented by the above-described composition formula of $RZrO_3$ is generally within the above-described range and a ferrite particle that has high environmental stability of charging property and good rising in charge amount can be obtained. The content ratio of zirconium in the ferrite particle is more preferably 0.08 mass % or more. The content ratio of zirconium in the ferrite particle is more preferably 2.60 mass % or less, and still more preferably 2.25 mass % or less. The zirconium content can be quantified by ICP elemental analysis in the same manner as Mg.

(2) R (Alkaline Earth Metal Element)

In the present invention, R is at least one element selected from the group consisting of Ca, Sr, Ba, and Ra, that is, an alkaline earth metal element. The alkaline earth metal element has an ionic radius sufficiently larger than that of zirconium, and forms a zirconate perovskite compound having a perovskite-type crystal structure. In the present invention, R is more preferably at least one element selected from the group consisting of Sr, Ca, and Ba. These elements undergo a solid phase reaction with zirconium under a predetermined temperature condition to form the zirconate perovskite compound. Therefore, the ferrite particle according to the present invention can be obtained by controlling the sintering temperature within a predetermined temperature range in the production process of the ferrite particle.

The content of the alkaline earth metal element (R) is more preferably 0.04 mass % or more and 3.15 mass % or less. In the case where the alkaline earth metal element (R) is contained within this range, the content ratio of the perovskite-type crystal phase component represented by the above-described composition formula of $RZrO_3$ is generally within the above-described range and a ferrite particle that has high environmental stability of charging property and good rising in charge amount can be obtained. The content ratio of the alkaline earth metal element (R) in the ferrite particle is more preferably 0.16 mass % or more. The content ratio of the alkaline earth metal element (R) in the ferrite particle is more preferably 2.75 mass % or less, and still more preferably 2.35 mass % or less. The content of the alkaline earth metal element can be quantified by ICP elemental analysis in the same manner as Mg.

The alkaline earth metal element undergoes a solid phase reaction with iron to form ferrite having a magnetoplumbite-type crystal structure and a precursor thereof. In the case where the alkaline earth metal element is contained in the above-described range, the ferrite particle contains, as subcomponents, various components having different crystal structures, such as ferrite having a magnetoplumbite-type crystal structure together with zirconium dioxide caused by a raw material of zirconium and a zirconate perovskite compound. In the case where the spinel-type crystal phase component is used as a main component, when a subcomponent having a crystal structure different from the spinel-type crystal structure is present in the particle, the main component grows in a direction of the particle surface which is relatively easy to grow, and the unevenness of the particle surface becomes an appropriate state. By uniformly containing these subcomponents in the particle, the unevenness of the particle surface can be controlled to be in a uniform state.

(3) Others

As a compound having a perovskite-type crystal structure, for example, barium titanate and strontium titanate are known. The ferrite particle according to the present invention contains substantially no Ti and contains substantially no perovskite-type crystal phase containing Ti. The phrase "containing substantially no Ti" means that when the ferrite particle is produced, Ti or a compound containing titanium such as $TiO_2$ is not used as a raw material, and Ti is not intentionally added. That is, Ti is not contained except for the case where Ti is contained within a range of inevitable impurities inevitably accompanying the following raw materials used in the production of the ferrite particle.

1-6. Amount of Eluted Chlorine

In the ferrite particle according to the present invention, the amount of eluted chlorine measured by an elution method is preferably 30 ppm or less. A procedure for measuring the amount of eluted chlorine by the elution method will be described in the section of Examples. In the case where the amount of eluted chlorine is 30 ppm or less, a ferrite particle having small environmental variation in charging property can be obtained.

As described above, when inevitable impurities such as Na, K, and Cl contained in the raw material are present on the surface of the ferrite particle, these elements are easily ionized, and moisture in the atmosphere is adsorbed on the surface of the ferrite particle. In the case where the amount of these inevitable impurities on the surface of the ferrite particle is large, for example, the resistance value greatly decreases under a high temperature and high humidity environment, and the environmental variation in charging property also increases.

For example, as the Fe raw material, iron oxide by-produced from a hydrochloric acid pickling step, generated during steel production is generally used. Therefore, the Fe raw material contains Cl as an inevitable impurity. Na and K are often contained in a Fe raw material, a Mn raw material, and a Mg raw material, and are more increased by using seawater, sodium hydroxide, or the like in the production process. Comparing with Na, K, and the like, the total amount of Cl contained in the raw material as an inevitable impurity is large, and when the amount of eluted chlorine measured by an elution method is small, the amount of other inevitable impurities tends to be small. The amount of eluted chlorine measured by the elution method represents the amount of chlorine attached to the surface of the ferrite particle. Therefore, as described above, in the case where the amount of eluted chlorine measured by the elution method is 30 ppm or less, the amount of inevitable impurities such as Na, K, and Cl attached to the surface of the ferrite particle is small, and even when the ambient humidity changes, the amount of moisture attached to the surface of the ferrite particle changes little, the variation in resistance value can be reduced, and the environmental variation in charging property can be reduced.

By using a raw material with high purity, the amount of inevitable impurities can be reduced. In addition, most of the inevitable impurities can be removed by performing heat treatment at a high temperature (for example, a similar temperature to a temperature suitable for growing the perovskite-type crystal phase) in a sintering step or the like to be described later. Since the ferrite particle according to the present invention contains a perovskite-type crystal phase component, the crystal grains are relatively small and the grain boundary volume is relatively large as described above. Therefore, even in the case where the content of inevitable impurities such as Cl is about the same, the inevitable impurities can be precipitated in the ferrite particle, and segregation of these inevitable impurities on the surface of the ferrite particle can be avoided. Therefore, as compared with the case where the perovskite-type crystal phase component is not contained, the amount of eluted chlorine by the elution method can be reduced, and the environmental variation in charging property can be reduced.

In order to exert the above-described effects, the amount of eluted chlorine is more preferably 25 ppm or less, still more preferably 20 ppm or less, yet more preferably 15 ppm or less, and yet still more preferably 10 ppm or less. Although the amount of eluted chlorine can also be reduced by performing a surface oxidation treatment after the sintering step described later, even in the case where the surface oxidation treatment is not performed after the sintering step, in the ferrite particle according to the present invention, the amount of eluted chlorine by the elution method can be reduced to 30 ppm or less by containing the spinel-type crystal phase component and the perovskite-type crystal phase component as described above.

1-7. Magnetic Property

Next, the magnetic property of the ferrite particle will be described. In the case where the ferrite particle is used as a core material of a carrier for an electrophotographic developer, saturation magnetization measured by VSM when a magnetic field of 1 K·1000/4π·A/m is applied is preferably 50 emu/g or more and 70 emu/g or less. In the case where the saturation magnetization is 50 emu/g or more, a magnetic force of the core material is high, and carrier scattering due to low magnetization can be satisfactorily prevented. The saturation magnetization and the electric resistance are in a trade-off relationship, and in the case where the saturation magnetization of the ferrite particle is within this range, the balance between the two becomes good, and an electrophotographic developer capable of satisfactorily performing high-quality electrophotographic printing can be obtained. When the magnetization is high but the resistance is low, carrier scattering due to low resistance may occur. By setting the saturation magnetization to 70 emu/g or less, carrier scattering due to low resistance can also be satisfactorily prevented.

1-8. Electrical Property

Next, the electrical property of the ferrite particle will be described. The resistance value M under a normal temperature and normal humidity environment (23° C., relative humidity 55%) when measured at an inter-electrode distance of 6.5 mm and an applied voltage of 1,000V is desirably $1.0 \times 10^6$ ($\Omega$) or more and $1.0 \times 10^{9.5}$ ($\Omega$) or less. In the case where the resistance value of the ferrite particle is within this range, when the ferrite particle is used as a core material and a resin coating layer is provided on the surface to form a carrier, carrier scattering due to electric charge injection can be prevented even when the resin coating layer peels off during stirring with the toner and the core material is exposed.

1-9. Physical Property (1) Volume Average Particle Diameter ($D_{50}$)

In the case where the ferrite particle is used as a core material of a carrier for an electrophotographic developer, the volume average particle diameter ($D_{50}$) is preferably 24 μm or more and 40 μm or less. The volume average particle diameter as used herein refers to a value measured by a laser diffraction and scattering method in accordance with JIS Z 8825: 2013. In the case where the volume average particle diameter is within this range, the charge imparting property to the toner is high, and the charge imparting property can be maintained for a long period of time. Therefore, the life of the electrophotographic developer can be extended.

On the other hand, in the case where the volume average particle diameter ($D_{50}$) of the ferrite particle is less than 24 since the particle diameter is small, carrier scattering is likely to occur. In addition, in the case where the volume average particle diameter ($D_{50}$) of the ferrite particle is less than 24 since the particle diameter is small, the ferrite particles are likely to aggregate. In the case where the ferrite particle is used as a core material and the surface thereof is coated with a resin to form a carrier, when the ferrite particles are aggregated, the surface of each ferrite particle cannot be satisfactorily coated with the resin. Thereafter, when the aggregation of the ferrite particles is loosened at the time of production or use of the developer, a content of the carrier having a large region not coated with the resin in the developer increases. Therefore, in the case where a developer is produced using a carrier having such a ferrite particle as a core material, a sufficient charge imparting property to the toner may not be obtained, which is not preferable.

On the other hand, in the case where the volume average particle diameter ($D_{50}$) of the ferrite particle exceeds 40 the particle diameter of each particle constituting the powder increases. Therefore, as compared with a ferrite particle having a small volume average particle diameter ($D_{50}$), a surface area of the carrier contributing to frictional charging with a toner is small when viewed as the entire powder. Therefore, a sufficient charge imparting property to the toner may not be obtained. In order to improve this, when the surface area of each ferrite particle is increased by imparting unevenness to the surface of each ferrite particle, the surface area of the carrier contributing to frictional charging with the toner can be increased. In this case, although the charge imparting property to the toner is improved, it is not preferable because a mechanical stress is applied to the convex portions of the carrier surface at the time of mixing with the toner or the like, and breaking or cracking of the carrier is likely to occur. That is, the strength of the carrier may not be maintained when the developer is used, which is not preferable.

From the above-described viewpoints, the lower limit value of the volume average particle diameter ($D_{50}$) is more preferably 27 μm, and still more preferably 30 μm. The upper limit value of the volume average particle diameter ($D_{50}$) is preferably 38 μm, and more preferably 36 μm.

(2) BET Specific Surface Area

The BET specific surface area of the ferrite particle is preferably within a range represented by the following formula. $0.08 \leq X \leq 0.550$ X in this formula is a BET specific surface area (m²/g) of the ferrite particle.

The BET specific surface area referred to herein can be, for example, a value measured using a specific surface area measuring device (model: Macsorb HM model-1208 (manufactured by Mountech Co., Ltd.)). In the case where the BET specific surface area of the ferrite particle is within the range represented by the above-mentioned formula, the unevenness of the surface of the ferrite particle is within an appropriate range with respect to the particle diameter. Therefore, when the ferrite particle is used as a core material, the surface can be favorably coated with a resin. Since an unevenness difference of the surface with respect to the particle diameter is reduced, it is possible to prevent concentration of a load on the convex portion when a mechanical stress is applied to the surface, and to prevent breaking and cracking. Therefore, when the ferrite particle is used as the core material, it is possible to prevent the resin from being peeled off from the surface at the time of mixing and stirring with a toner, to prevent breaking and cracking of the carrier, and to prevent carrier scattering or the like.

In order to exert these effects, the lower limit value of the above-mentioned formula is more preferably 0.100, and still more preferably 0.120. The upper limit value of the formula is more preferably 0.400.

(3) Apparent Density

The apparent density of the ferrite particle is preferably within the range represented by the following formula. $1.90 \leq Y \leq 2.50$ Y in the above-mentioned formula represents the apparent density (g/cm$^3$) of the ferrite particle.

The apparent density herein refers to a value measured by a funnel method in accordance with JIS Z 2504: 2012. In the case where the apparent density of the ferrite particle is within the range represented by the above-mentioned formula, the fluidity is good and the own weight is heavy, and thus the contact frequency and the contact strength with a toner can be increased.

In order to exert these effects, the lower limit value of the above-mentioned formula is more preferably 1.95, still more preferably 2.00, and yet more preferably 2.15. The upper limit value of the formula is more preferably 2.45.

2. Carrier for Electrophotographic Developer

Next, the carrier for an electrophotographic developer according to the present invention will be described. The carrier for an electrophotographic developer according to the present invention includes the above-described ferrite particle and a resin coating layer provided on the surface of the ferrite particle. That is, the above-described ferrite particle is used as a core material of a carrier for an electrophotographic developer. Since the ferrite particle is as described above, the resin coating layer will be mainly described here.

(1) Type of Coating Resin

The type of the resin (coating resin) constituting the resin coating layer is not particularly limited. For example, a fluorine resin, an acrylic resin, an epoxy resin, a polyamide resin, a polyamide-imide resin, a polyester resin, an unsaturated polyester resin, a urea resin, a melamine resin, an alkyd resin, a phenol resin, a fluorine acrylic resin, an acryl-styrene resin, a silicone resin, or the like can be used. In addition, a modified silicone resin obtained by modifying a silicone resin or the like with a resin such as an acrylic resin, a polyester resin, an epoxy resin, a polyamide resin, a polyamide-imide resin, an alkyd resin, a urethane resin, or a fluorine resin may be used. For example, the coating resin is preferably a thermosetting resin from the viewpoint of preventing resin peeling due to mechanical stress received during stirring and mixing with a toner. Examples of the thermosetting resin suitable for the coating resin include an epoxy resin, a phenol resin, a silicone resin, an unsaturated polyester resin, a urea resin, a melamine resin, an alkyd resin, and a resin containing these resins. However, as described above, the type of the coating resin is not particularly limited, and an appropriate type can be appropriately selected according to the type of the toner to be combined, the use environment, and the like.

The resin coating layer may be formed by using one type of resin, or may be formed by using two or more types of resins. In the case where two or more types of resins are used, one resin coating layer may be formed by mixing two or more types of resins, or a plurality of resin coating layers may be formed. For example, it is also preferable that a first resin coating layer having good adhesion to the ferrite particle is provided on the surface of the ferrite particle, and a second resin coating layer for imparting desired charge imparting property to the carrier is provided on the surface of the first resin coating layer.

(2) Resin Coating Amount

The amount of the resin that coats the surface of the ferrite particle (resin coating amount) is preferably 0.1 mass % or more and 10 mass % or less with respect to the ferrite particle used as the core material. In the case where the resin coating amount is less than 0.1 mass %, it is difficult to sufficiently coat the surface of the ferrite particle with the resin, and it is difficult to obtain a desired charge imparting ability. In the case where the resin coating amount is more than 10 mass %, aggregation of carrier particles occurs at the time of production, and the fluidity of the developer in an actual machine or the property of the developer such as the charge imparting property to a toner varies along with a decrease in productivity such as a decrease in yield, which are not preferable.

(3) Additive

The resin coating layer may contain an additive such as a conductive agent and a charge control agent for the purpose of controlling the electric resistance, the charge amount, and the charge speed of the carrier. Examples of the conductive agent include conductive carbon, oxides such as titanium oxide and tin oxide, and various organic conductive agents. However, since the electrical resistance of the conductive agent is low, in the case where the amount of the conductive agent added is too large, electric charge leakage is likely to occur. Therefore, the content of the conductive agent is preferably 0.25 mass % or more and 20.0 mass % or less, more preferably 0.5 mass % or more and 15.0 mass % or less, and still more preferably 1.0 mass % or more and 10.0 mass % or less with respect to a solid content of the coating resin.

Examples of the charge control agent include various charge control agents generally used for a toner, and a silane coupling agent. The type of the charge control agent or the coupling agent is not particularly limited, but a charge control agent such as a nigrosine dye, a quaternary ammonium salt, an organic metal complex, or a metal-containing monoazo dye, an aminosilane coupling agent, a fluorine-based silane coupling agent, or the like can be preferably used. The content of the charge control agent is preferably 0.25 mass % or more and 20.0 mass % or less, more preferably 0.5 mass % or more and 15.0 mass % or less, and still more preferably 1.0 mass % or more and 10.0 mass % or less with respect to the solid content of the coating resin.

3. Electrophotographic Developer

Next, an embodiment of the electrophotographic developer according to the present invention will be described. The electrophotographic developer includes the above-described carrier for an electrophotographic developer and a toner.

As the toner constituting the electrophotographic developer, for example, a polymerized toner produced by a polymerization method or a pulverized toner produced by a pulverization method can be preferably used. The toner may contain various additives, and may be any toner as long as it can be used in combination with the carrier as an electrophotographic developer.

The volume average particle diameter ($D_{50}$) of the toner is preferably 2 μm or more and 15 μm or less, and more preferably 3 μm or more and 10 μm or less. In the case where the volume average particle diameter ($D_{50}$) of the toner is within this range, an electrophotographic developer capable of performing high-quality electrophotographic printing can be obtained.

The mixing ratio of the carrier and the toner, that is, the toner concentration is preferably 3 mass % or more and 15 mass % or less. The electrophotographic developer containing the toner at this concentration can easily obtain a desired image density, and can more favorably prevent fogging and toner scattering.

On the other hand, in the case where the electrophotographic developer is used as a replenishing developer, the amount of the toner is preferably 2 parts by mass or more and 50 parts by mass or less with respect to 1 part by mass of the carrier.

The electrophotographic developer can be suitably used in various electrophotographic developing devices to which a magnetic brush developing method is applied in which a carrier is attracted and attached to a magnetic drum or the like by a magnetic force to form a brush shape, the toner is conveyed, and the toner is attached to an electrostatic latent image formed on a photoreceptor or the like while applying a bias electric field to form a visible image. The electrophotographic developer can be used not only in an electrophotographic developing device using a DC bias electric field but also in an electrophotographic developing device using an alternating bias electric field in which an AC bias electric field is superimposed on a DC bias electric field when a bias electric field is applied.

4. Producing Method

Hereinafter, a method for producing the ferrite powder, the carrier core material for an electrophotographic developer, the carrier for an electrophotographic developer, and the electrophotographic developer, according to the present invention will be described.

4-1. Ferrite Powder and Carrier Core Material for Electrophotographic Developer

The ferrite powder and the carrier core material for an electrophotographic developer according to the present invention can be produced as follows.

First, appropriate amounts of raw materials are weighed so as to obtain a desired ferrite composition, and then the raw materials are pulverized and mixed by a ball mill, a vibration mill, or the like for 0.5 hours or longer, preferably 1 hour or longer and 20 hours or shorter, and then are calcined.

For example, in $(MnO)a(MgO)b(Fe_2O_3)c$ (where $a+b+c=100$ (mol %), $a \neq 0$, $0 \leq b$, and $c \neq 0$), in order to produce a spinel-type ferrite particle having a desired composition, the respective raw materials are weighed and pulverized and mixed so that a, b, and c become desired values. As the raw materials, for example, it is preferable to use $Fe_2O_3$, $Mg(OH)_2$ and/or $MgCO_3$, and one or more types of manganese compounds selected from a group consisting of $MnO_2$, $Mn_2O_3$, $Mn_3O_4$, and $MnCO_3$.

The ferrite particle according to the present invention contains a perovskite-type crystal phase component represented by a composition formula of $RZrO_3$ (where R is an alkaline earth metal element). Therefore, as for the alkaline earth metal element (R), an oxide of the alkaline earth metal element (R) is used as a raw material, weighed so as to have a desired addition amount, and pulverized and mixed with other raw materials. As for Zr, $ZrO_2$ can be used as a raw material.

Here, in the case where the ferrite particle containing 0.05 mass % or more and 4.00 mass % or less of the perovskite-type crystal phase component (provided to be a mass fraction obtained when the phase composition analysis on the crystal phase constituting the ferrite particle is performed by Rietveld analysis of an X-ray diffraction pattern) is produced, it is preferable to blend $ZrO_2$: 0.05 or more and 4.0 or less and it is more preferable to blend $ZrO_2$: 0.1 or more and 3.0 or less in molar ratio with respect to a main component raw material: 100. It is preferable to blend an oxide of the alkaline earth metal element (R): 0.1 or more and 4.0 or less and it is more preferable to blend the oxide of the alkaline earth metal element (R): 0.2 or more and 3.0 or less in molar ratio with respect to the main component raw material: 100. The perovskite-type crystal phase component is generated by a solid phase reaction between the oxide of the alkaline earth metal element (R) and $ZrO_2$. Therefore, a generation amount of the perovskite-type crystal phase component can be adjusted by appropriately changing the addition amount and the addition ratio of the oxide of the alkaline earth metal element (R) and $ZrO_2$ within the above-described ranges of the preferable blending amounts.

When the ferrite particle according to the present invention is produced, $ZrO_2$ is weighed so as to have a desired addition amount, and pulverized and mixed with other raw materials. In order to uniformly disperse zirconium dioxide in the particle, it is desirable to add zirconium dioxide at the time of pulverizing and mixing the raw materials. It is also preferable that raw materials other than $ZrO_2$ are pulverized, mixed, and calcined in the air, then $ZrO_2$ is added thereto, and the obtained mixture is further pulverized and mixed. In this case, a pulverized product obtained by pulverizing and mixing raw materials other than $ZrO_2$ is pelletized by using a pressure molding machine or the like, and then calcined at a temperature of 700° C. or higher and 1,200° C. or lower in the air, and then $ZrO_2$ is added.

After all the raw materials including $ZrO_2$ are pulverized and mixed, or after raw materials other than $ZrO_2$ are pulverized, mixed, and calcined, a predetermined amount of $ZrO_2$ is added to the obtained calcined product, and the mixture is further pulverized by a ball mill, a vibration mill, or the like, then, in any case, water is added to the pulverized mixture, and the mixture is finely pulverized using a bead mill or the like to obtain a slurry. The degree of pulverization can be controlled by adjusting a diameter of beads used as a media, composition, and pulverization time. In order to uniformly disperse the raw materials, it is preferable to use fine beads having a particle diameter of 1 mm or less as a media. In order to uniformly disperse the raw materials, the pulverized product is preferably pulverized so that the volume average particle diameter ($D_{50}$) of the pulverized product is 2.5 μm or less, and more preferably 2.0 μm or less. In order to prevent abnormal grain growth, it is preferable to perform pulverization so that the particle diameter ($D_{90}$) on a coarse side of the particle diameter distribution is 3.5 μm or less. By adjusting these, the perovskite-type crystal phase component can be more uniformly dispersed from the surface to the inside of the particle, and the above-described various functions and effects can be exerted.

In addition, in order to obtain the ferrite particle according to the present invention, $ZrO_2$ having a BET specific surface area of 20 m$^2$/g to 150 m$^2$/g and a volume average particle diameter ($D_{50}$) of 0.5 μm to 2.5 μm is preferably used as a raw material. By using a raw material having such characteristics, it is possible to uniformly promote the growth of the perovskite-type crystal phase component while favorably dispersing $ZrO_2$ in the particle. The segregation of the crystal phase component and the abnormal grain growth of each crystal phase component in the particle can be prevented, the perovskite-type crystal phase component can be uniformly dispersed in the particle, and the amount of inevitable impurities such as Na, K, and Cl on the surface of the particle can be reduced. The BET specific surface area can be adjusted within an appropriate range, the occurrence of breaking and cracking at the interface between different crystal phases that do not form a solid solution with each other can be prevented even when mechanical stress is applied, and the strength of the ferrite particle can be improved.

Next, a dispersant, a binder, and the like are preferably added to the slurry thus obtained as necessary to adjust the viscosity to 2 poise or more and 4 poise or less. At this time, polyvinyl alcohol or polyvinyl pyrrolidone can be used as the binder.

The slurry adjusted as described above is sprayed by using a spray dryer and dried to obtain a granulated product. At this time, as granulation conditions, it is preferable that a discharge amount is 20 Hz or more and 50 Hz or less, the number of revolutions of an atomizer disk is 11,000 rpm or more and 20,000 rpm or less, and a drying temperature is 100° C. or higher and 500° C. or lower. For example, in order to obtain a ferrite particle having an apparent density within the above-described range, it is preferable that the number of revolutions of the atomizer disk is 11,000 rpm or more and 16,000 rpm or less, and the drying temperature is 150° C. or higher and 300° C. or lower.

Next, it is preferable to classify the granulated product before sintering to remove fine particles contained in the granulated product in order to obtain a ferrite powder having a uniform particle diameter. Classification of the granulated product can be performed by using known airflow classification, a sieve, or the like.

Next, the classified granulated product is sintered. The granulated product is preferably subjected to a pre-sintering in a sintering furnace such as a rotary kiln in which the granulated product (product to be sintered) flows and passes through a hot section, and then subjected to a sintering.

By performing the pre-sintering in a sintering furnace such as a rotary kiln in which the granulated product flows and passes through a hot section, it is possible to uniformly remove an organic substance such as a binder used at the time of granulation from the granulated product in a relatively short time as compared with the case where the pre-sintering is performed in a state where the granulated product is left to stand in a sagger or the like. At the same time, a part of the ferrite reaction can be advanced at the time of the pre-sintering, and the occurrence of variations in the surface Rz at the time of the subsequent sintering can be prevented.

In the case where the pre-sintering is performed by using the above-described sintering furnace, the temperature is preferably, for example, 750° C. or higher and 1,050° C. or lower. By performing the pre-sintering in this temperature range, it becomes easier to prevent the abnormal grain growth and to prevent the occurrence of the variation in the surface roughness Rz as described above while efficiently performing the removal of the organic substance and the ferrite reaction. Further, in order to efficiently perform the removal of the organic substance and the ferrite reaction, the pre-sintering temperature is more preferably 800° C. or higher, and still more preferably 850° C. or higher. In order to prevent abnormal grain growth, the pre-sintering temperature is more preferably 1,000° C. or lower, and still more preferably 980° C. or lower.

The sintering is preferably performed by holding the granulated product at a temperature of 850° C. or higher for 1.5 hours or longer and 24 hours or shorter in an inert atmosphere or a weakly oxidizing atmosphere. The sintering temperature is not particularly limited as long as the ferrite particle according to the present invention is obtained. Here, the inert atmosphere or the weakly oxidizing atmosphere means that an oxygen concentration is 0.1 vol % (1,000 ppm) or more and 5 vol % (50,000 ppm) or less in a mixed gas atmosphere of nitrogen gas and oxygen gas, more preferably means that the atmospheric oxygen concentration is 0.1 vol % (1,000 ppm) or more and 3.5 vol % (35,000 ppm) or less, and still more preferably 0.1 vol % (1,000 ppm) or more and 2.5 vol % (25,000 ppm) or less.

For example, the ferrite particle can be obtained in which a zirconium component is well dispersed in the grain boundary while sufficiently generating the spinel-type crystal phase by performing the sintering by holding the granulated product at a temperature (for example, 850° C. or higher and 1,150° C. or lower) suitable for the generation of the spinel-type crystal phase for 3 hours or longer and then holding the granulated product at a temperature (for example, 1,150° C. or higher and 1,500° C. or lower) suitable for the generation of the perovskite-type crystal phase represented by the composition formula of $RZrO_3$ such as strontium zirconate for 1 hour or longer. In this case, the BET specific surface area, the resistance value M, the apparent density, and the magnetization can be made to fall within the scope of the present invention by appropriately controlling the sintering temperature, the sintering time, and the atmospheric oxygen concentration during sintering according to the type of the alkaline earth metal element (R) and the blending amount of $ZrO_2$. The amount of eluted chlorine can be further reduced by holding the granulated product at a temperature of 1,200° C. or higher for 2 hours or longer.

For example, in the case of strontium zirconate ($SrZrO_3$), the sintering temperature is preferably maintained at 1,170° C. or higher and 1,400° C. or lower, more preferably 1,180° C. or higher and 1,350° C. or lower, and still more preferably 1,200° C. or higher and 1,330° C. or lower for 1 hour or longer in order to make the apparent density within the range of the present invention while sufficiently generating the perovskite-type crystal phase component. In this case, the blending amount of zirconium oxide ($ZrO_2$) is preferably 0.2 mol to 3.00 mol.

For example, in the case of calcium zirconate ($CaZrO_3$) or barium zirconate ($BaZrO_3$), it is preferable to finely pulverize the raw materials, add a reaction accelerator, and then perform sintering at a predetermined temperature. In order to generate a perovskite-type crystal phase component of calcium zirconate ($CaZrO_3$) or barium zirconate ($BaZrO_3$), it is necessary to perform sintering at a high temperature of 2,000° C. or higher in the case where a reaction accelerator is not added. On the other hand, by finely pulverizing the raw materials to a primary particle diameter of about several tens of nanometers and adding an aluminum compound (for example, alumina ($Al_2O_3$) or the like) or the like as a reaction accelerator, these perovskite-type crystal phase components can be generated even at a temperature of 1,500° C. or lower. As described above, the ferrite particle according to the present invention can be obtained by maintaining the granulated product at a temperature suitable for generating the perovskite-type crystal phase component according to the target composition and adjusting other conditions as necessary.

Unlike the pre-sintering, the sintering is preferably performed in a sintering furnace such as a tunnel kiln or an elevator kiln in which a granulated product (product to be sintered) passes through a hot section in a state of being left to stand in a sagger or the like, rather than a sintering furnace such as a rotary kiln in which a granulated product flows and passes through a hot section. In a sintering furnace such as a rotary kiln in which a granulated product flows and passes through a hot section, in the case where the oxygen concentration of the sintering atmosphere is low, the granulated product may adhere to an inner surface of the furnace when passing through the hot section, and it may not be possible to sufficiently apply heat to the granulated product that flows and passes through the inside of the furnace. In this case, since the granulated product passes through the hot section without being sufficiently sintered, even if the surface of the obtained sintered product is sufficiently sintered, the inside thereof is often insufficiently sintered. Such a sintered product does not satisfy the strength required for a carrier core material for an electrophotographic developer, and may also not satisfy the magnetic property and the electrical property required for a carrier core material for an electrophotographic developer due to insufficient ferrite reaction inside the sintered product. Further, in the case where the inside of the sintered product is insufficiently sintered, a perovskite-type crystal phase component represented by the composition formula of $RZrO_3$ cannot be sufficiently generated in the sintering step. Therefore, it is difficult to obtain the ferrite particle according to the present invention.

On the other hand, in the case where the granulated product is sintered in a sintering furnace in which the granulated product passes through the hot section in a state in which the granulated product is left to stand in a sagger or the like, the inside of the product to be sintered can be sufficiently sintered, and thus it is easy to obtain a ferrite particle that has high magnetization and high resistance and in which a perovskite-type crystal phase component represented by the composition formula of $RZrO_3$ is sufficiently generated. For these reasons, it is preferable to use a tunnel kiln, an elevator kiln, or the like when performing the sintering step.

Thereafter, the sintered product is crushed and classified to obtain ferrite particles. As a classification method, the particle diameter is adjusted to a desired particle diameter by using an existing air classification method, a mesh filtration method, a precipitation method, or the like. In the case where dry recovery is performed, the recovery may be performed by a cyclone or the like. In the case where the particle diameter is adjusted, two or more types of the above-described classification methods may be selected and performed, and coarse particles and fine particles may be removed by changing the conditions by one classification method.

Thereafter, if necessary, the surface of the ferrite particles can be subjected to a surface oxidation treatment by heating at a low temperature, to adjust the surface resistance of the ferrite particles. The surface oxidation treatment can be performed by subjecting the ferrite particles to a heat treatment at 400° C. or higher and 730° C. or lower, preferably 450° C. or higher and 650° C. or lower in an oxygen-containing atmosphere such as air by using a rotary electric furnace, a batch electric furnace, or the like. In the case where the heating temperature during the surface oxidation treatment is lower than 400° C., the surface of the ferrite particles may not be sufficiently oxidized, and desired surface resistance characteristics may not be obtained. On the other hand, the case where the heating temperature is higher than 730° C. is not preferable in a manganese-containing ferrite, because the oxidation of manganese proceeds excessively and the magnetization of the ferrite particles decreases. In order to uniformly form an oxide film on the surface of the ferrite particles, it is preferable to use a rotary electric furnace. However, the surface oxidation treatment is an optional step.

4-2. Carrier for Electrophotographic Developer

In the carrier for an electrophotographic developer according to the present invention, the above-described ferrite particle is used as a core material, and a resin coating layer is provided on the surface of the ferrite particle. The resin constituting the resin coating layer is as described above. When the resin coating layer is formed on the surface of the ferrite particle, a known method, for example, a brush coating method, a spray drying method using a fluidized bed, a rotary drying method, a liquid immersion drying method using a universal stirrer, or the like can be adopted. In order to improve a ratio of a resin coating area to the surface of the ferrite particle (resin coating ratio), it is preferable to adopt a spray drying method using a fluidized bed. Regardless of which method is adopted, the ferrite particle can be subjected to a resin coating treatment once or a plurality of times. A resin coating liquid used for forming the resin coating layer may contain the additives described above. The resin coating amount on the surface of the ferrite particle is as described above, and thus the description thereof is omitted here.

After the resin coating liquid is applied to the surface of the ferrite particle, if necessary, baking may be performed by an external heating method or an internal heating method. In the external heating method, a fixed or fluidized electric furnace, a rotary electric furnace, a burner furnace, or the like can be used. In the internal heating method, a microwave furnace can be used. In the case where a UV curable resin is used as the coating resin, a UV heater is used. The baking is required to be performed at a temperature equal to or higher than a melting point or a glass transition point of the coating resin. in the case where a thermosetting resin, a condensation-crosslinking resin, or the like is used as the coating resin, it is necessary to perform the baking at a temperature at which curing of the resin sufficiently progresses.

4-3. Electrophotographic Developer

Next, the method for producing the electrophotographic developer according to the present invention will be described. The electrophotographic developer according to the present invention includes the above-described carrier for an electrophotographic developer and a toner. As described above, both the polymerized toner and the pulverized toner can be preferably used as the toner.

The polymerized toner can be produced by a known method such as a suspension polymerization method, an emulsion polymerization method, an emulsion aggregation method, an ester elongation polymerization method, or a phase transition emulsion method. For example, a colored dispersion liquid in which a colorant is dispersed in water by using a surfactant, a polymerizable monomer, a surfactant, and a polymerization initiator are mixed and stirred in an aqueous medium, the polymerizable monomer is emulsified and dispersed in the aqueous medium, and polymerization is performed while stirring and mixing, and then a salting agent is added to salt-out polymer particles. The particles obtained by salting are filtered, washed, and dried to obtain a polymerized toner. Thereafter, if necessary, an external additive may be added to the dried toner particles.

Further, in the production of the polymerized toner particles, a toner composition containing a polymerizable monomer, a surfactant, a polymerization initiator, a colorant, and the like is used. The toner composition may contain a fixability-improving agent and a charge control agent.

As the pulverized toner, for example, a binder resin, a colorant, a charge control agent, and the like are sufficiently mixed with a mixer such as a Henschel mixer, and then the mixture is melt-kneaded and uniformly dispersed with a twin-screw extruder or the like, cooled, finely pulverized with a jet mill or the like, and then classified with a wind classifier or the like to obtain a toner having a desired particle diameter. If necessary, wax, a magnetic powder, a viscosity modifier, and other additives may be contained. Further, an external additive may be added after classification.

Next, the present invention will be specifically described with reference to Examples and Comparative Examples. However, the present invention is not limited to the following examples.

Example 1

(1) Ferrite Particle

In Example 1, a ferrite particle containing a perovskite-type crystal phase component represented by a composition formula of $SrZrO_3$ (R=Sr) and having a Mg content of 0.45 mass % or less was produced as follows. The ferrite particle according to Example 1 was a spinel-type ferrite particle containing a spinel-type crystal phase component as a main component, and a $Fe_2O_3$ raw material, a MnO raw material, and a MgO raw material were respectively weighed as main component raw materials so as to satisfy a molar ratio of 50.0 of $Fe_2O_3$, 49.5 in terms of MnO, and 0.5 in terms of MgO. In order to obtain a perovskite-type crystal phase component, a SrO raw material was weighed so as to satisfy a molar ratio of 0.8 of SrO with respect to 100 of the main component raw materials. Here, trimanganese tetraoxide was used as the MnO raw material, magnesium oxide was used as the MgO raw material, ferric oxide was used as the $Fe_2O_3$ raw material, and strontium carbonate was used as the SrO raw material.

Next, the weighed raw materials were pulverized by a dry media mill (vibration mill, stainless steel beads having a diameter of ⅛ inch) for 5 hours, and the obtained pulverized product was made into pellets having a size of about 1 mm cube by a roller compactor. The obtained pellets were subjected to a vibration sieve having an opening of 3 mm to remove coarse powders, then subjected to a vibration sieve having an opening of 0.5 mm to remove fine powders, and then heated in a continuous electric furnace at 800° C. for 3 hours to perform a calcination. Next, the mixture was pulverized by using a dry media mill (vibration mill, stainless steel beads having a ⅛ inch diameter) until the average particle diameter became about 5 μm. At this time, the pulverization time was 6 hours.

Water and zirconium dioxide having a BET specific surface area of 30 m²/g and an average particle diameter of 2 μm as a $ZrO_2$ raw material for obtaining a perovskite-type crystal phase component were added to the obtained pulverized product, followed by pulverization for 6 hours by using a wet media mill (horizontal bead mill, zirconia beads having a diameter of 1 mm). At this time, zirconium dioxide was added to the pulverized product so as to satisfy a molar ratio of 0.30 of $ZrO_2$ with respect to 100 of the main component raw materials. When the particle diameter (primary particle diameter of pulverization) of the obtained slurry was measured by a laser diffraction particle diameter distribution measurement device (LA-950, Horiba, Ltd.), $D_{50}$ was about 1.9 μm and $D_{90}$ was 3.3 μm.

Further, an appropriate amount of a dispersant was added to the slurry prepared as described above, and as a binder, PVA (polyvinyl alcohol) was added in an amount of 0.4 mass % with respect to the solid content (amount of the calcined product in the slurry), followed by granulation and drying by a spray dryer. The particle diameter of the obtained granulated product was adjusted, and then the granulated product was heated in an air atmosphere at 950° C. for 2 hours by using a rotary electric furnace (rotary kiln) to perform a pre-sintering.

Thereafter, the granulated product was held, for 3 hours, in a tunnel-type electric furnace at a sintering temperature (holding temperature) of 1,225° C. in an atmosphere having an oxygen concentration of 0.5 vol %, thereby performing a sintering on the granulated product. At this time, the heating rate was 100° C./hour, and the cooling rate was 110° C./hour. The obtained sintered product was crushed by a hammer crusher, and further classified by a gyro shifter (sieve shaker) and a turbo classifier (airflow classifier) to adjust the particle diameter, and low-magnetic components were separated by magnetic separation to obtain ferrite particles. The main production conditions of the ferrite particle according to Example 1 are shown in Table 1.

(2) Carrier for Electrophotographic Developer

The obtained ferrite particles were used as a core material, and the ferrite particles were coated with a silicone resin as described below to obtain a carrier according to Example 1.

First, a silicone resin solution (resin solid content: 10 mass %) was prepared by mixing a silicone resin (KR-350, manufactured by Shin-Etsu Chemical Co., Ltd.) and toluene. The resin solution and the ferrite particles according to Example 1 were mixed by a universal stirrer to coat the surface of the ferrite particles with the resin solution. At this time, a resin solution was used in an amount such that the resin solid content was 1.0 mass % with respect to the ferrite particles. Subsequently, the ferrite particles to which the resin solution was attached were heated while being stirred at 250° C. for 3 hours by a heat exchange type stirring and heating device, to volatilize volatile components contained in the resin solution to dry the ferrite particles. Accordingly, the carrier for an electrophotographic developer according to Example 1 including the resin coating layer on the surface of the ferrite particles was obtained.

Example 2

In this Example, ferrite particles according to Example 2 were produced in the same manner as in Example 1 except that, as main component raw materials, the $Fe_2O_3$ raw material and the MnO raw material were respectively weighed so as to satisfy a molar ratio of 50.0 of $Fe_2O_3$ and 50.0 in terms of MnO, and a spinel composition containing no MgO was used as a main component. Main producing conditions in Example 2 are shown in Table 1. A carrier for an electrophotographic developer was produced in the same manner as in Example 1 except that the obtained ferrite particles were used as a core material.

Example 3

In this Example, ferrite particles according to Example 3 were produced in the same manner as in Example 1 except that the $Fe_2O_3$ raw material, the MnO raw materials, and the MgO raw materials were respectively weighed so as to satisfy a molar ratio of 50.0 of $Fe_2O_3$, 48.0 in terms of MnO, and 2.0 in terms of MgO as main component raw materials. Main producing conditions in Example 3 are shown in Table 1. A carrier for an electrophotographic developer was produced in the same manner as in Example 1 except that the obtained ferrite particles were used as a core material.

Example 4

In this Example, ferrite particles according to Example 4 were produced in the same manner as in Example 1 except that the $Fe_2O_3$ raw material, the MnO raw material, and the MgO raw material were respectively weighed as main component raw materials so as to satisfy a molar ratio of 59.5 of $Fe_2O_3$, 40.0 in terms of MnO, and 0.5 in terms of MgO, and the sintering temperature (holding temperature) at the time of sintering was 1,213° C. Main producing conditions in Example 4 are shown in Table 1. A carrier for an electrophotographic developer was produced in the same manner as in Example 1 except that the obtained ferrite particles were used as a core material.

Example 5

In this Example, ferrite particles of Example 5 were produced in the same manner as in Example 1 except that the $Fe_2O_3$ raw material, the MnO raw material, and the MgO raw material were weighed so as to satisfy a molar ratio of 45.0 of $Fe_2O_3$, 54.5 in terms of MnO, and 0.5 in terms of MgO, and the sintering temperature (holding temperature) at the time of sintering was set to 1,218° C. Main producing conditions in Example 5 are shown in Table 1. A carrier for an electrophotographic developer was produced in the same manner as in Example 1 except that the obtained ferrite particles were used as a core material.

Reference Example

As Reference Example, ferrite particles having a Mg content of more than 0.45 mass % were produced as follows. The ferrite particles according to this Reference Example were also spinel-type ferrite particles containing a spinel-type crystal phase component as a main component, and the MnO raw material, the MgO raw material, and the $Fe_2O_3$ raw material were respectively weighed as main component raw materials so as to satisfy a molar ratio of 38.3 in terms of MnO, and 10.4 in terms of MgO, and 51.3 $Fe_2O_3$. The SrO raw material was weighed so as to satisfy a molar ratio of 0.8 of SrO with respect to 100 of the main component raw materials. The same raw materials as those used in Example 1 were used.

Next, the weighed raw materials were pulverized for 5 hours by a dry media mill (vibration mill, stainless steel beads having a diameter of ⅛ inch), and the obtained pulverized product was made into pellets having a size of about 1 mm cube by a roller compactor. The obtained pellets were subjected to a vibration sieve having an opening of 3 mm to remove coarse powders, then subjected to a vibration sieve having an opening of 0.5 mm to remove fine powders, and then heated in a continuous electric furnace at 800° C. for 3 hours to perform a calcination. Next, the mixture was pulverized by using a dry media mill (vibration mill, stainless steel beads having a ⅛ inch diameter) until the average particle diameter became about 5 μm. At this time, the pulverization time was 6 hours.

Water and zirconium dioxide as a $ZrO_2$ raw material were added to the obtained pulverized product, followed by pulverization for 6 hours by using a wet media mill (horizontal bead mill, zirconia beads having a diameter of 1 mm). At this time, zirconium dioxide was added to the pulverized product so as to satisfy a molar ratio of 1.0 of $ZrO_2$ with respect to 100 of the main component raw materials. When the particle diameter (primary particle diameter of pulverization) of the obtained slurry was measured by a laser diffraction particle diameter distribution analyzer (LA-950, Horiba, Ltd.), $D_{50}$ was about 2 μm, and $D_{90}$ was 3.2 μm.

Further, an appropriate amount of a dispersant was added to the slurry prepared as described above, and as a binder, PVA (polyvinyl alcohol) was added in an amount of 0.4 mass % with respect to the solid content (amount of the calcined product in the slurry), followed by granulation and drying by a spray dryer. The particle diameter of the obtained granulated product was adjusted, and then the granulated product was heated in an air atmosphere at 800° C. for 2 hours by using a rotary electric furnace to remove organic components such as the dispersant and the binder.

Thereafter, the granulated product was held in a tunnel-type electric furnace at a sintering temperature (holding temperature) of 1,250° C. in an atmosphere having an oxygen concentration of 0 vol % for 3 hours, thereby performing a sintering of the granulated product. At this time, the heating rate was 100° C./hour, and the cooling rate was 110° C./hour. The obtained sintered product was crushed by a hammer crusher, and further classified by a gyro shifter (sieve shaker) and a turbo classifier (airflow classifier) to adjust the particle diameter, and low-magnetic components were separated by magnetic separation to obtain ferrite particles.

The obtained ferrite particles were subjected to a surface oxidation treatment in a rotary electric furnace including a hot section and a cooling section following the hot section, and then cooled to obtain surface oxidation-treated ferrite particles. In the surface oxidation treatment, an oxide film was formed on the surface of the ferrite particles in the hot section at 540° C. in an air atmosphere. A carrier for an electrophotographic developer can be obtained by coating the ferrite particles produced in this manner as a carrier core material with a resin in the same procedure as in Example 1.

COMPARATIVE EXAMPLES

Comparative Example 1

In this Comparative Example, ferrite particles according to Comparative Example 1 were produced in the same manner as in Example 1 except that the $Fe_2O_3$ raw material, the MnO raw material, and the MgO raw material were weighed so as to satisfy a molar ratio of 50.0 of $Fe_2O_3$, 40.0 in terms of MnO, and 10.0 in terms of MgO, and the sintering temperature (holding temperature) during the sintering was set to 1,230° C. Main production conditions in Comparative Example 1 are shown in Table 1. A carrier for an electrophotographic developer was produced in the same manner as in Example 1 except that the obtained ferrite particles were used as a core material.

Comparative Example 2

In this Comparative Example, ferrite particles according to Comparative Example 2 were produced in the same manner as in Example 1 except that the $Fe_2O_3$ raw material, the MnO raw material, and the MgO raw material were weighed so as to satisfy a molar ratio of 50.0 of $Fe_2O_3$, 47.0 in terms of MnO, and 3.0 in terms of MgO. Main production conditions in Comparative Example 2 are shown in Table 1. A carrier for an electrophotographic developer was produced in the same manner as in Example 1 except that the obtained ferrite particles were used as a core material.

Comparative Example 3

In this Comparative Example, ferrite particles according to Comparative Example 3 were produced in the same manner as in Example 1 except that the $Fe_2O_3$ raw material, the MnO raw material, and the MgO raw material were weighed so as to satisfy a molar ratio of 65.0 of $Fe_2O_3$, 35.0 in terms of MnO, and 3.0 in terms of MgO, and the sintering temperature (holding temperature) during the sintering was set to 1,210° C. Main production conditions in Comparative Example 3 are shown in Table 1. A carrier for an electrophotographic developer was produced in the same manner as in Example 1 except that the obtained ferrite particles were used as a core material.

Comparative Example 4

In this Comparative Example, ferrite particles according to Comparative Example 4 were produced in the same manner as in Example 1 except that SrO was not used as a raw material and the sintering temperature (holding temperature) at the time of sintering was set to 1,200° C. Main production conditions in Comparative Example 4 are shown in Table 1. A carrier for an electrophotographic developer was produced in the same manner as in Example 1 except that the obtained ferrite particles were used as a core material.

Comparative Example 5

In this Comparative Example, ferrite particles according to Comparative Example 5 were produced in the same manner as in Example 1 except that the $Fe_2O_3$ raw material, the MnO raw material, and the MgO raw material were weighed so as to satisfy a molar ratio of 50.0 of $Fe_2O_3$, 49.5 in terms of MnO, and 0.5 in terms of MgO, $ZrO_2$ was not used as a raw material, and the sintering temperature (holding temperature) during the sintering was 1,195° C. Main production conditions in Comparative Example 5 are shown in Table 1. A carrier for an electrophotographic developer was produced in the same manner as in Example 1 except that the obtained ferrite particles were used as a core material.

Comparative Example 6

In this Comparative Example, ferrite particles according to Comparative Example 6 were produced in the same manner as in Example 1 except that the $Fe_2O_3$ raw material, the MnO raw material, and the MgO raw material were weighed so as to satisfy a molar ratio of 50.0 of $Fe_2O_3$, 47.0 in terms of MnO, and 3.0 in terms of MgO, and the sintering temperature (holding temperature) during the sintering was 1,135° C. Main production conditions in Comparative Example 6 are shown in Table 1. A carrier for an electrophotographic developer was produced in the same manner as in Example 1 except that the obtained ferrite particles were used as a core material.

Reference Comparative Example

In this Reference Comparative Example, ferrite particles according to Reference Comparative Example were produced in the same manner as in Reference Example except that a $TiO_2$ raw material was used instead of the $ZrO_2$ raw material for comparison with Reference Example, the $TiO_2$ raw material was weighed so as to satisfy a molar ratio of 0.80 mol of $TiO_2$ with respect to 100 of the main component raw materials, and the sintering temperature (holding temperature) at the time of the sintering was set to 1,200° C. A carrier for an electrophotographic developer was produced in the same manner as in Reference Example except that the obtained ferrite particles were used as a core material, and an electrophotographic developer was produced by using the obtained carrier for an electrophotographic developer.

Evaluation

With respect to the ferrite particles according to Examples and Comparative Examples obtained as described above, (1) the content of the perovskite-type crystal phase component, (2) the content of the spinel-type crystal phase and the elemental composition, (3) the dispersion degree of Zr element, (4) the volume average particle diameter, (5) the saturation magnetization, (6) the resistance, (7) the BET specific surface area, (8) the apparent density, and (9) the amount of eluted chlorine were measured. Electrophotographic developers were prepared by using the respective carriers for an electrophotographic developer according to Examples and Comparative Examples obtained as described above, and (10) the charging property was evaluated. Hereinafter, the evaluation methods/measurement methods and evaluation results will be described.

1. Evaluation Methods/Measurement Methods (1) Perovskite-Type Crystal Phase Component Content (Mass %)

Each of the ferrite particles produced in Examples and Comparative Examples was used as a specimen, and a powder X-ray diffraction pattern was subjected to Rietveld analysis to determine the content of the perovskite-type crystal phase component in each ferrite particle. It may be difficult to identify and quantify each crystal phase in a waveform separation of the powder X-ray diffraction pattern, but it is possible to identify and quantify each phase by Rietveld analysis based on a crystal structure model.

As an X-ray diffraction device, "X'PertPRO MPD", manufactured by PANalytical was used. A Co tube (CoKα ray) was used as an X-ray source. A centralized optical system and a high-speed detector "X'Celarator" were used as an optical system. The measurement conditions are as follows.

Scanning speed: 0.08°/sec
Divergence slit: 1.0°
Scattering slit: 1.0°
Receiving slit: 0.15 mm
Voltage and current values of enclosing tube: 40 kV/40 mA
Measurement range: 2θ=15° to 90°
Integration number: 5 times Based on the obtained measurement results, a crystal structure was identified as follows according to the structure disclosed in "National Institute for Materials Science, Atom-Work" (URL: http://crystdb.nims.go.jp/)". A phase: manganese ferrite (spinel-type crystal phase) Crystal structure: space group F d −3 m (No. 227) B phase: perovskite-type crystal phase represented by the composition formula of $RZrO_3$ Crystal structure: space group P n m a (No. 62) C phase: zirconium dioxide (zirconia) Crystal structure: space group P −4 2 m (No. 111) Wyckoff positions of atoms in the space group Fd-3 m belonging to the A phase were set to 8b as a Mn atom, 16c as a Fe atom, and 32e as an O atom.

Next, the identified crystal structure was refined by using analysis software "RIETAN-FP v2.83 (http://fujioizumi.verse.jp/download/download.html)", to thereby calculate an abundance ratio in terms of mass as a phase composition ratio of the crystal phases. As a profile function, a pseudo-Voigt function of Thompson, Cox, Hasting was used, and asymmetrization was performed by a Howard method. After confirming that an Rwp value and an S value indicating the accuracy of fitting were Rwp of 2% or less and S value of 1.5 or less, respectively, and main peaks of the B and C phases were fitted at $2\theta=35°$ to $37°$, the parameters were optimized.

Based on a Rietveld analysis result of the X-ray diffraction pattern performed as described above, the content (mass %) of the perovskite-type crystal phase component (B phase) when the phase composition analysis of the crystal phase constituting the ferrite particle was performed was obtained.

(2) Content (Mass %) and Elemental Composition (Mass %) of Spinel-Type Crystal Phase Component An analysis was performed by adding $Fe_2O_3$ (D phase), $Mn_2O_3$ (E phase), and strontium ferrite (F phase) to the above-obtained measurement results of the A phase, the B phase, and the C phase by X-ray diffraction, and the content (mass %) of the spinel-type crystal phase component in each ferrite particle was obtained.

The elemental composition of each ferrite particle was determined by ICP analysis as follows. First, 0.2 g of the ferrite particles was weighed, thereto were added 60 ml of pure water, 20 ml of 1N hydrochloric acid, and 20 ml of 1N nitric acid, and the mixture was heated to prepare an aqueous solution in which the ferrite particle was completely dissolved. The contents (wt %) of Fe, Mn, and Mg were measured by using an ICP analyzer (ICPS-1000IV, manufactured by Shimadzu Corporation).

(3) Dispersion Degree of Zr Element

With respect to each of the ferrite particles produced in Examples and Comparative Examples, the dispersion degree of Zr element defined by the following formula was measured.

Dispersion degree of Zr=Zr(s)/Zr(c)

Zr(s): Zr content (mass %) in a surface portion of a particle cross section measured by energy dispersive X-ray analysis Zr(c): Zr content (mass %) in a central portion of the particle cross section measured by energy dispersive X-ray analysis Here, a description will be given with reference to the FIGURE. The central portion of the cross section (particle cross section) of the ferrite particle is defined as follows. When a maximum diameter in the particle cross section (for example, an SEM image) is defined as a line segment Dx, a midpoint of the line segment Dx is defined as a center C of the particle cross section, and end points of the line segment Dx are defined as points P. The center C is set as the center position, and a square in which a length of one side is 35% of the length of the line segment Dx is defined as a square S. A region surrounded by the square S is defined as the central portion.

The surface portion of the particle cross section is defined as follows. A point on the line segment Dx at a distance of 15% of the length of the line segment Dx from the point P toward the center C is defined as a point P'. A rectangle in which a line segment having a length of 35% of the length of the line segment Dx, orthogonal to the line segment Dx, and having the point P or the point P' as a midpoint is a long side, and a line segment having a length of 15% of the length of the line segment Dx is a short side is defined as a rectangle $R_1$. In the present invention, in the cross section of the ferrite particle, a region surrounded by the rectangle $R_1$ is defined as the surface portion. The FIGURE schematically illustrates a cross-sectional shape of the ferrite particle 100 in a simplified manner in a circular form for explanation, and does not show an actual cross-sectional shape of the ferrite particle according to the present invention.

Energy dispersive X-ray analysis (EDX analysis) is performed on the central portion and the surface portion of the particle cross section defined as described above, and the content of the Zr element in each region is measured. A specific measurement method is as follows.

(a) A ferrite particle is embedded in a resin, and cross-section processing is performed by ion milling to prepare a cross-sectional specimen for measurement. The ion milling is performed by using IM4000PLUS, manufactured by Hitachi High-Technologies Corporation under an argon atmosphere at an acceleration voltage of an ion beam of 6.0 kV. Here, the ferrite single particle to be analyzed is a particle in which the maximum diameter Dx is in a range of $D_{50}\times0.8\leq Dx\leq D_{50}\times1.2$, where $D_{50}$ is the volume average particle diameter of the ferrite particle (powder) containing the ferrite single particle.

(b) With respect to the obtained cross-sectional specimen, the cross section of the ferrite particle to be analyzed is observed with a scanning electron microscope (SEM, SU8020, manufactured by Hitachi High-Technologies Corporation) at an acceleration voltage of 15 kV and WD of 15 mm. At this time, a magnification is set so that only one ferrite particle to be analyzed is present in the field of view and the entire particle is included in the field of view.

(c) Then, EDX analysis is performed on the central portion and the surface portion (regions defined above) of the cross section of the ferrite particle. In the EDX analysis, mapping collection is performed on Fe, Mn, Mg, Sr, and Zr as targets by an energy dispersive X-ray analyzer (EMax X-Max50, manufactured by Horiba, Ltd.), and each element amount (mass %) is calculated from the obtained X-ray spectrum peak. The amount of Zr in the central portion of the obtained particle cross section is defined as "Zr(c)", and the amount of Zr in the surface portion of the particle cross section is defined as "Zr(s)".

Then, by substituting the Zr amount (Zr(c)) in the central portion of the particle cross section and the Zr amount (Zr(s)) in the surface portion of the particle cross section obtained by the EDX analysis into the above-mentioned formula (1), the dispersion degree of Zr in the ferrite particle to be analyzed can be obtained.

At this time, the amount of Zr in the surface portion of the particle cross section is an average value of the amount of Zr in each region by defining, as the surface portion, four regions surrounded by a rectangle $R_2$ defined similarly to the rectangle $R_1$ as well as a rectangle $R_3$ and a rectangle $R_4$ defined based on points Q and Q' that are defined similarly to the points P and P' for a straight line Dy passing through the center C of the particle cross section and orthogonal to the straight line Dx. The rectangles $R_1$, $R_2$, $R_3$, and $R_4$ are arranged at substantially equal intervals along a contour of the particle cross section.

Here, in the case where there are a plurality of line segments Dx having the maximum diameter for one ferrite particle, those having a relationship where the corresponding line segment Dy (line segment QQ') has a length of 0.5 or more with respect to a line segment Dx are defined as Dx and Dy. The ferrite particle produced in each of Examples has a substantially spherical shape. Accordingly, in the case where the length of the line segment Dy (line segment QQ') with respect to the line segment Dx is less than 0.5, there is a high probability that such a particle is a particle in which breaking, cracking, or the like occurs. Therefore, as the ferrite single particle to be analyzed, one having the length of the line segment Dy (line segment QQ') with respect to the line segment Dx being 0.5 or more is used.

(4) Volume Average Particle Diameter ($D_{50}$)

The volume average particle diameter ($D_{50}$) was measured as follows by using a Microtrac particle diameter analyzer (Model 9320-X100), manufactured by Nikkiso Co., Ltd. The ferrite particle produced in each of Examples and Comparative Examples was used as a specimen, 10 g of the specimen and 80 ml of water were placed in a 100 ml beaker, 2 to 3 drops of a dispersant (sodium hexametaphosphate) were added thereto, and dispersion was performed for 20 seconds by using an ultrasonic homogenizer (UH-150, manufactured by SMT Co., LTD.) with an output level of 4, to remove bubbles formed on the surface of the beaker to prepare a sample. The volume average particle diameter of the sample was measured by the Microtrac particle diameter analyzer by using this sample.

(5) Saturation Magnetization

The saturation magnetization was measured by using a vibrating sample magnetometer (model: VSM-C7-10A (manufactured by Toei Industry Co., Ltd.)). A specific measurement procedure is as follows. First, the ferrite particle produced in each of Examples and Comparative Examples was used as a specimen, and a cell having an inner diameter of 5 mm and a height of 2 mm was filled with the specimen and set in the magnetometer. Then, a magnetic field was applied and swept until 1 K·1000/4π·A/m (=1 kOe). Next, the applied magnetic field was reduced, and a hysteresis curve was created on a recording paper. The magnetization at the applied magnetic field of 1 K·1000/4π·A/m was read from the data of this curve, and was defined as the saturation magnetization.

(6) Resistance

The ferrite particle produced in each of Examples and Comparative Examples was used as a specimen, and a resistance value M (Ω) under a normal temperature and normal humidity environment (23° C., relative humidity: 55%) was measured by the following procedure. First, a distance between electrodes was set to 6.5 mm, nonmagnetic parallel plate electrodes (10 mm×40 mm) were arranged to face each other, and 200 mg of the specimen was filled therebetween. The specimen was held between the parallel plate electrodes by magnets attached to the respective parallel plate electrodes (surface magnetic flux density: 1,500 Gauss, area of the magnet in contact with the electrode: 10 mm×30 mm). Then, a voltage of 1,000V was applied between the parallel plate electrodes facing each other, and the measurement was performed by using an electrometer (manufactured by KEITHLEY, insulation resistance meter model 16517A). The above-described resistance value M is a resistance value measured by the above-described procedure in a normal temperature and normal humidity environment (23° C., relative humidity: 55%) after the specimen is exposed for 12 hours or longer in a constant temperature and constant humidity chamber whose ambient temperature and humidity are adjusted to the normal temperature and normal humidity environment by this method.

(7) BET Specific Surface Area

The ferrite particle produced in each of Examples and Comparative Examples was used as a specimen, and the BET specific surface area was determined by the following procedure using a specific surface area measuring device (Macsorb HM model-1208, Mountech Co., Ltd.). First, about 20 g of the specimen was put into a glass petri dish, and then was degassed to −0.1 MPa by a vacuum oven. After degassing and confirming that the degree of vacuum in the glass petri dish reached −0.1 MPa or less, the specimen was heated at 200° C. for 2 hours. About 5 g to 7 g of the pretreated specimen was accommodated in a standard sample cell dedicated to the specific surface area measuring device. A mass of the specimen accommodated in the standard sample cell was accurately weighed by a precision balance. Then, the standard sample cell accommodating the specimen was set in a measurement port, and the BET specific surface area was measured by a one-point method at a temperature of 10° C. to 30° C. and a relative humidity of 20% to 80%. The mass of the specimen was input at the end of the measurement, and the calculated value was used as the measurement value of the BET specific surface area.

(8) Apparent Density

The apparent density was measured in accordance with JIS Z2504: 2012 (apparent density test method for metal powder).

(9) Amount of Eluted Chlorine

First, a specimen was accurately weighed within 50.000 g+0.0002 g and placed in a 150 ml glass bottle. Next, 50 ml of phthalate (pH 4.01) was added to the glass bottle. Then, 1 ml of an ion strength modifier was continuously added to the glass bottle, and a lid was closed. Then, the specimen in the glass bottle was stirred for 10 minutes by a paint shaker. Thereafter, a magnet was placed on the bottom of the 150 ml glass bottle, and the sample is filtered into a PP container (50 ml) by using No. 5B filter paper while paying attention so that the carrier does not fall. A voltage of the obtained supernatant was measured with a pH meter. Similarly, solutions (pure water, 1 ppm, 10 ppm, 100 ppm, and 1,000 ppm) having different chlorine concentrations prepared for the calibration curve were measured, and the amount of eluted chlorine in the specimen was calculated from these values.

(10) Charging Property

By using the carrier for an electrophotographic developer produced in each of Examples and Comparative Examples, an electrophotographic developer was prepared by the following method, and the charge amount was determined.

The carrier for an electrophotographic developer produced in each of Examples and Comparative Examples and a toner were mixed with a Turbula mixer to obtain 50 g of a developer (toner concentration: 8.0 wt %). Here, a commercially available negative toner (average particle diameter: about 5.8 μm) used in a full-color printer was used as the toner. The developer was exposed to each environment described below for 12 hours or longer. Thereafter, the developer was placed in a 50 cc glass bottle and stirred at a rotation speed of 100 rpm, after 30 mins from the start of stirring, the developer was sampled to prepare a specimen for measuring the charge amount.

As a charge amount measuring device, a magnet roll in which magnets (magnetic flux density: 0.1 T) were placed in total of eight so that their N poles and S poles were arranged alternately was disposed inside a cylindrical aluminum tube (hereinafter, referred to as a sleeve) having a diameter of 31 mm and a length of 76 mm, and a cylindrical electrode having a gap of 5.0 mm from the sleeve was disposed on the outer periphery of the sleeve.

After 0.5 g of the specimen was uniformly attached to the sleeve, a DC voltage of 2,000 V was applied between the outer electrode and the sleeve for 60 seconds while rotating the inner magnet roll at 100 rpm with the outer aluminum tube fixed, and the toner in the developer was transferred to the outer electrode. At this time, an electrometer (insulation resistance meter model 6517A, manufactured by KEITHLEY Corporation) was connected to the cylindrical electrode, and the electric charge amount of the transferred toner was measured. After 60 seconds elapsed, the applied voltage was cut off, the rotation of the magnet roll was stopped, then the outer electrode was removed, and the weight of the toner transferred to the electrode was measured. The charge amount was calculated from the measured electric charge amount and the transferred toner weight.

In the measurement on the charge amount, the following conditions were adopted as the predetermined environmental conditions.

Normal temperature and normal humidity environment (NN environment): temperature 20° C. to 25° C., relative humidity 50% to 60%

High temperature and high humidity environment (HH environment): temperature 30° C. to 35° C., relative humidity 80% to 85%

Here, the charge amount measured under the normal temperature and normal humidity environment is defined as an NN charge amount, and the charge amount measured under the high temperature and high humidity environment is defined as an HH charge amount.

Then, the charge amount measured for the specimen which was stirred for 30 minutes was defined as "30 min value", and the charge amounts under the normal temperature and normal humidity environment and the high temperature and high humidity environment and the charge amount environmental variation were obtained based on the following calculation formulae.

Charge amount=30 min value environmental variation=$HH$ charge amount (30 min value)–$NN$ charge amount (30 min value)

2. Evaluation Results

Table 2 shows the measurement results of the evaluation items. In Table 2, the XRD analysis value indicates the content (mass %) of the perovskite-type crystal phase component obtained by Rietveld analysis on the powder X-ray diffraction pattern. The resistance value M indicates the value of its logarithmic value log M.

(1) Content and Elemental Composition of Spinel-Type Crystal Phase Component

The content of the spinel-type crystal phase component in each of the ferrite particles according to Examples and Comparative Examples is as shown in Table 2, and it is confirmed that each of the ferrite particles is a spinel-type ferrite particle containing 90 mass % or more of the spinel-type crystal phase component. When a composition ratio of the spinel-type crystal phase component is determined based on the measured values of the ICP elemental analysis, it is confirmed that the composition ratio is substantially the same as the charged molar ratio, but slightly varies from the charged molar ratio.

From the results of ICP elemental analysis, it is confirmed that the ferrite particle according to Example 2 has a Mg content of 0 mass %, and the ferrite particles according to Examples other than Example 2 have a Mg content of 0.10 mass % to 0.42 mass %. On the other hand, the Mg contents of the ferrite particles according to Comparative Examples 1 to 3 and Comparative Example 6 are 0.56 mass % to 2.14 mass %, and are higher than those of the ferrite particles according to Examples of the present invention. In the ferrite particles according to Comparative Example 4 and Comparative Example 5, the Mg contents are 0.11 mass % and 0.10 mass %, respectively, and it is confirmed that the Mg contents thereof are about the same as those of Examples 1 and 5. When the ferrite particles according to Examples were produced, a compound containing Ti such as Ti or $TiO_2$ was not used as a raw material, and these ferrite particles do not substantially contain Ti.

(2) Content of Perovskite-Type Crystal Phase Component and Dispersion Degree of Zr Element As shown in Table 2, it is confirmed that, in the ferrite particles according to Examples 1 to 5, by using an oxide containing an alkaline earth metal element (R) and zirconium dioxide as raw materials, ferrite particles containing 0.27 mass % to 0.35 mass % of a perovskite-type crystal phase component represented by the composition formula of $RZrO_3$ were obtained. The dispersion degree of Zr in each of the ferrite particles according to Examples 1 to 5 was 1.0, and it is confirmed that the perovskite-type crystal phase component is well dispersed in the ferrite particles. In the ferrite particle according to Reference Example, the content of the perovskite-type crystal phase component was 0.95 mass %, and the dispersion degree of Zr was also 1.0. As described above, it was confirmed that even in the case where the Mg content exceeds the range defined in the present invention, a ferrite particle containing a perovskite-type crystal phase component represented by the composition formula of $RZrO_3$ can be obtained.

In Comparative Examples 1 to 3, ferrite particles containing 0.27 mass % to 0.35 mass % of the perovskite-type crystal phase component and having a dispersion degree of Zr of 1.0 were also obtained. On the other hand, in Comparative Examples 4 to 6, ferrite particles containing the perovskite-type crystal component were not obtained. Since in Comparative Example 4, "SrO" was not used as a raw material, and in Comparative Example 5, "$ZrO_2$" was not used as a raw material, the perovskite-type crystal phase component ($SrZrO_2$) was not obtained. In Comparative Example 6, "SrO" and "$ZrO_2$" were used in the same amounts as in Examples 1 to 5 and Comparative Examples 1 to 3, but it is considered that since the sintering temperature was low as 1,135° C., the perovskite-type crystal phase was not generated. Since in Reference Comparative Example, "$ZrO_2$" was not used as a raw material, and "$TiO_2$" was used as a raw material, a ferrite particle containing a perovskite-type crystal phase component represented by the composition formula of $RZrO_3$ could not be obtained.

(3) Amount of Eluted Chlorine

The ferrite particles according to Examples 1 to 5 were sintered in a suitable sintering temperature range for obtaining a perovskite-type crystal phase component. It is considered that since the sintering temperature in each of these Examples was high, the amount of eluted chlorine was as low as 4 ppm or less due to decomposition of the chlorine compound during sintering. Among Examples 1 to 5, in Example 4 in which the content of $Fe_2O_3$ was large, the amount of eluted chlorine was relatively large, and in Example 5 in which the content of $Fe_2O_3$ was small, the amount of eluted chlorine was relatively small.

The ferrite particles according to Comparative Examples 1 and 2 were also sintered at about the same sintering temperature as that of Examples 1 to 5, but since the content of $Fe_2O_3$ was larger than that of these Examples, the amount of eluted chlorine was small. In the ferrite particle according to Comparative Example 3, it is considered that since the content of $Fe_2O_3$ was larger than that of Examples, the chlorine content caused by the Fe raw material was large and the amount of eluted chlorine was large. In the ferrite particles according to Comparative Example 4 and Comparative Example 5, the content of MgO is about the same as that of Examples, and the content of MnO with respect to $Fe_2O_3$ is relatively large. Further, the sintering temperature in the sintering step is also relatively high. Accordingly, it is considered that the amount of eluted chlorine could be reduced to a low level although the value is slightly higher than that of Examples. On the other hand, in the ferrite particle according to Comparative Example 6, it is considered that since the sintering temperature was as low as 1,135° C., inevitable impurities such as chlorine in the raw materials could not be sufficiently decomposed and removed in the sintering step, and as a result, the amount of eluted chlorine was as large as 32 ppm as compared with Examples and the other Comparative Examples.

(4) Saturation Magnetization and Resistance

It is confirmed that the saturation magnetization of the ferrite particles according to Examples 1 to 4 is as high as 60 emu/g. The saturation magnetization of the ferrite particle according to Example 5 was 54 emu/g, and it is considered that the reason is that the content of $Fe_2O_3$, which is a high magnetization component, was large as compared with other Examples. On the other hand, with respect to the resistance value, the logarithmic value (log M) of the resistance value M in Examples 1 to 5 was in the range of 6.5 to 7.4, which is in a suitable range as a carrier core material of an electrophotographic developer.

In Comparative Example 3, as compared with Examples 1 to 4, the content of $Fe_2O_3$, which is a high magnetization component, was large, and the saturation magnetization showed a high value of 75 emu/g. The logarithmic value (log M) of the resistance value M of the ferrite particle according to Comparative Example 3 was equal to or less than a measurement limit value (B.D.). Since the ferrite particle according to Comparative Example 3 has extremely low resistance, it is difficult to use the ferrite particle as a carrier core material of an electrophotographic developer. In Comparative Example 1, Comparative Example 2, and Comparative Examples 4 to 6, it is confirmed that the resistance value is in a range suitable for a carrier core material of an electrophotographic developer under a normal temperature and normal humidity environment.

(5) Others

The volume average particle diameter ($D_{50}$), the BET specific surface area, and the apparent density of each of Examples and Comparative Examples are as shown in Table 2.

(6) Charging Property

Next, the charging property will be described with reference to Table 3. The NN charge amount (30 min value) of each of the electrophotographic developers according to Examples was 65 μC/g or more, which is higher than that of Comparative Examples. The HH charge amount (30 min value) of each of the electrophotographic developers according to Examples was 56 μC/g or more, which is higher than that of Comparative Examples (except for Comparative Example 2). Further, with respect to the environmental variation in the charge amount, each Example showed a value within −10, and it is confirmed that the environmental variation in the charge amount is small. According to these results, it is confirmed that by using the ferrite particle according to each example as a carrier core material for an electrophotographic developer, electrophotographic printing can also be performed even under a high temperature and high humidity environment without significantly deteriorating the charging property from a normal temperature and normal humidity environment.

On the other hand, in the electrophotographic developer according to Comparative Example 2, the NN charge amount (30 min value) was 62.5 μC/g, and the HH charge amount (30 min value) was 56.3 μC/g, which are close to those of the Examples, but in the electrophotographic developers according to the other Comparative Examples, the NN charge amount (30 min value) was less than 60 μC/g, and the HH charge amount (30 min value) was less than 50 μC/g, showing that the charging property was inferior to those of Examples. It is confirmed that the electrophotographic developers according to Comparative Examples 3, 5, and 6 have large environmental variation in charge amount and low environmental stability in charging property.

TABLE 1

| | | Main raw material blending amount (molar ratio) | | | Blending amount with respect to main raw material (molar ratio) | | |
| --- | --- | --- | --- | --- | --- | --- | --- |
| | | | | | | R | Total amount |
| | | $Fe_2O_3$ | MnO | MgO | $ZrO_2$ | Type | Blending amount | ($ZrO_2$ + R) |
| Examples | 1 | 50.0 | 49.5 | 0.5 | 0.30 | SrO | 0.80 | 1.10 |
| | 2 | 50.0 | 50.0 | 0.0 | 0.30 | SrO | 0.80 | 1.10 |
| | 3 | 50.0 | 48.0 | 2.0 | 0.30 | SrO | 0.80 | 1.10 |
| | 4 | 59.5 | 40.0 | 0.5 | 0.30 | SrO | 0.80 | 1.10 |
| | 5 | 45.0 | 54.5 | 0.5 | 0.30 | SrO | 0.80 | 1.10 |
| Comparative Examples | 1 | 50.0 | 40.0 | 10.0 | 0.30 | SrO | 0.80 | 1.10 |
| | 2 | 50.0 | 47.0 | 3.0 | 0.30 | SrO | 0.80 | 1.10 |
| | 3 | 65.0 | 35.0 | 3.0 | 0.30 | SrO | 0.80 | 1.10 |
| | 4 | 50.0 | 49.5 | 0.5 | 0.30 | SrO | 0.00 | 0.30 |

TABLE 1-continued

| | | | | | | | | |
|---|---|---|---|---|---|---|---|---|
| | 5 | 50.0 | 49.5 | 0.5 | 0.00 | SrO | 0.80 | 0.80 |
| | 6 | 50.0 | 47.0 | 3.0 | 0.30 | SrO | 0.80 | 1.10 |

| | | Pre-sintering condition | Sintering condition | |
|---|---|---|---|---|
| | | Sintering temperature (° C.) | Sintering temperature (° C.) | Oxygen concentration (vol %) |
| Examples | 1 | 950 | 1,225 | 0.5 |
| | 2 | 950 | 1,225 | 0.5 |
| | 3 | 950 | 1,225 | 0.5 |
| | 4 | 950 | 1,213 | 0.5 |
| | 5 | 950 | 1,218 | 0.5 |
| Comparative Examples | 1 | 950 | 1,230 | 0.5 |
| | 2 | 950 | 1,225 | 0.5 |
| | 3 | 950 | 1,210 | 0.5 |
| | 4 | 950 | 1,200 | 0.5 |
| | 5 | 950 | 1,195 | 0.5 |
| | 6 | 950 | 1,135 | 0.5 |

TABLEW 2

| | | ICP mass analysis (mass %) | | | | | Perovskite-type crystal phase component (mass %) | Spinel-type crystal phase component (mass %) | Dispersion degree of Zr |
|---|---|---|---|---|---|---|---|---|---|
| | | Fe | Mn | Mg | Sr | Zr | | | |
| Ex. | 1 | 47.99 | 23.37 | 0.10 | 0.60 | 0.24 | 0.33 | 96.42 | 1.0 |
| | 2 | 47.93 | 23.58 | 0.00 | 0.60 | 0.23 | 0.35 | 97.33 | 1.0 |
| | 3 | 48.18 | 22.75 | 0.42 | 0.60 | 0.24 | 0.34 | 96.88 | 1.0 |
| | 4 | 53.45 | 17.61 | 0.39 | 0.56 | 0.22 | 0.27 | 97.43 | 1.0 |
| | 5 | 44.91 | 26.75 | 0.11 | 0.63 | 0.24 | 0.33 | 92.33 | 1.0 |
| Comp Ex. | 1 | 49.23 | 19.37 | 2.14 | 0.62 | 0.24 | 0.35 | 96.43 | 1.0 |
| | 2 | 48.31 | 22.34 | 0.63 | 0.61 | 0.24 | 0.32 | 96.76 | 1.0 |
| | 3 | 55.40 | 14.67 | 0.56 | 0.53 | 0.21 | 0.27 | 96.31 | 1.0 |
| | 4 | 48.34 | 23.54 | 0.11 | 0.00 | 0.24 | 0.00 | 96.55 | 1.0 |
| | 5 | 48.15 | 23.45 | 0.10 | 0.60 | 0.00 | 0.00 | 96.86 | — |
| | 6 | 48.31 | 22.34 | 0.63 | 0.61 | 0.24 | 0.00 | 95.70 | 1.0 |

| | | Volume average particle size $D_{50}$ (μm) | Saturation magnetization (emu/g) | Resistance value (logΩ) | BET specific surface area (m$^2$/g) | Apparent density (g/cm$^3$) | Amount of eluted chlorine (ppm) |
|---|---|---|---|---|---|---|---|
| Ex. | 1 | 34.3 | 62.0 | 7.3 | 0.155 | 2.27 | 2 |
| | 2 | 34.6 | 64.0 | 7.0 | 0.163 | 2.26 | 2 |
| | 3 | 34.2 | 60.0 | 7.4 | 0.145 | 2.26 | 2 |
| | 4 | 34.8 | 68.0 | 6.5 | 0.158 | 2.29 | 4 |
| | 5 | 34.1 | 54.0 | 7.1 | 0.171 | 2.24 | 1 |
| Comp Ex. | 1 | 33.9 | 57.0 | 7.1 | 0.165 | 2.23 | 2 |
| | 2 | 34.7 | 59.0 | 7.5 | 0.156 | 2.26 | 2 |
| | 3 | 34.0 | 75.0 | B.D. | 0.148 | 2.32 | 8 |
| | 4 | 34.4 | 63.0 | 7.1 | 0.143 | 2.33 | 5 |
| | 5 | 34.1 | 62.0 | 7.2 | 0.157 | 2.34 | 6 |
| | 6 | 34.9 | 54.0 | 6.9 | 0.454 | 2.02 | 32 |

TABLE 3

| | | NN charge amount 30 min value (μC/g) | HH charge amount 30 min value (μC/g) | HH-NN charge environmental variation (μC/g) |
|---|---|---|---|---|
| Examples | 1 | 69.1 | 64.1 | −5.0 |
| | 2 | 71.0 | 64.0 | −7.0 |
| | 3 | 67.2 | 61.4 | −5.8 |
| | 4 | 65.3 | 56.3 | −9.0 |
| | 5 | 67.2 | 58.9 | −8.3 |
| Comparative Examples | 1 | 54.3 | 50.8 | −3.5 |
| | 2 | 62.5 | 56.3 | −6.2 |
| | 3 | 57.3 | 47.9 | −9.4 |
| | 4 | 50.9 | 39.3 | −11.6 |

TABLE 3-continued

|   | NN charge amount 30 min value (μC/g) | HH charge amount 30 min value (μC/g) | HH-NN charge environmental variation (μC/g) |
|---|---|---|---|
| 5 | 53.8 | 42.0 | −11.8 |
| 6 | 44.4 | 27.9 | −16.5 |

INDUSTRIAL APPLICABILITY

According to the present invention, it is possible to provide a ferrite particle having high environmental stability of charging property and good charge rising property, a carrier core material for an electrophotographic developer, a carrier for an electrophotographic developer, and an electrophotographic developer.

The invention claimed is:

1. A ferrite particle comprising:
   a crystal phase component containing a perovskite-type crystal represented by a composition formula of $RZrO_3$ (wherein R is an alkaline earth metal element),
   a Mg content of 0.45 mass % or less, and
   wherein the crystal phase component containing the perovskite-type crystal is contained in an amount of 0.05 mass % or more and 4.00 mass % or less when a phase composition analysis on a crystal phase constituting the ferrite particle is performed by Rietveld analysis of an X-ray diffraction pattern.

2. The ferrite particle according to claim 1, wherein R is at least one element selected from the group consisting of Sr, Ca, and Ba.

3. The ferrite particle according to claim 1, having a Cl concentration measured by an elution method of 30 ppm or less.

4. The ferrite particle according to claim 1, wherein the ferrite particle is a spinel-type ferrite particle containing Mn, and satisfying the following formula when a Mn content in the ferrite particle is denoted x (mass %) and a Fe content in the ferrite particle is denoted y (mass %):

$$0.30y \leq x \leq 0.60y.$$

5. The ferrite particle according to claim 1, comprising substantially no Ti.

6. A carrier core material for an electrophotographic developer, comprising:
   the ferrite particle described in claim 1.

7. A carrier for an electrophotographic developer, comprising:
   the ferrite particle described in claim 1; and
   a resin coating layer provided on a surface of the ferrite particle.

8. An electrophotographic developer comprising:
   the carrier for an electrophotographic developer described in claim 7; and
   a toner.

9. The electrophotographic developer according to claim 8, which is used as a replenishing developer.

* * * * *